US010612110B2

(12) United States Patent
Domínguez et al.

(10) Patent No.: US 10,612,110 B2
(45) Date of Patent: Apr. 7, 2020

(54) METHOD AND SYSTEM FOR LASER HARDENING OF A SURFACE OF A WORKPLACE

(71) Applicant: ETXE-TAR, S.A., Elgoibar (Guipúzcoa) (ES)

(72) Inventors: Jesús Domínguez, Elgoibar (ES); Paula Sancho, Elgoibar (ES); Olatz Bilbao, Elgoibar (ES)

(73) Assignee: ETXE-TAR, S.A., Elgoibar (Guipúzcoa) (ES)

( * ) Notice: Subject to any disclaimer, the term of this patent is extended or adjusted under 35 U.S.C. 154(b) by 504 days.

(21) Appl. No.: 15/125,063

(22) PCT Filed: Feb. 11, 2015

(86) PCT No.: PCT/EP2015/052879
§ 371 (c)(1),
(2) Date: Sep. 9, 2016

(87) PCT Pub. No.: WO2015/135715
PCT Pub. Date: Sep. 17, 2015

(65) Prior Publication Data
US 2017/0022584 A1    Jan. 26, 2017

(30) Foreign Application Priority Data
Mar. 11, 2014    (EP) .................................... 14382086

(51) Int. Cl.
*C21D 10/00* (2006.01)
*C21D 9/30* (2006.01)
(Continued)

(52) U.S. Cl.
CPC ........ *C21D 10/005* (2013.01); *B23K 26/0604* (2013.01); *B23K 26/082* (2015.10);
(Continued)

(58) Field of Classification Search
CPC ... C21D 9/30; C21D 1/09; C21D 1/06; C21D 10/005; B23K 37/0235; B23K 26/0604;
(Continued)

(56) References Cited

U.S. PATENT DOCUMENTS 4,313,771 A    2/1982 Lorenzo et al.
4,797,532 A    1/1989 Maiorov
(Continued)

FOREIGN PATENT DOCUMENTS

CN    103215411 A    7/2013
CN    103290176 A    9/2013
(Continued)

OTHER PUBLICATIONS

F. Vollertsen, et al. "State of the art of laser Hardening and Cladding" Proceedings of the Third International WLT-Conference on Lasers in Manufacturing, Jun. 2005.
(Continued)

*Primary Examiner* — Daniel C. McCracken
(74) *Attorney, Agent, or Firm* — Cantor Colburn LLP

(57) ABSTRACT

A method of laser hardening a surface area of a workpiece, such as a surface of a journal of a crankshaft, includes the step of: generating a relative movement between the surface of the workpiece and a laser source to allow a laser spot to subsequently be projected onto different portions of said surface area. The method also includes the step of repetitively scanning the laser beam so as to produce a two-dimensional equivalent effective laser spot on said surface area, during the relative movement. The scanning pattern can include at least three substantially parallel lines which the laser spot follows in a certain order. When the workpiece includes several journals having different widths, two laser sources may be used to harden the surface area of the wider journals.

17 Claims, 11 Drawing Sheets

(51) Int. Cl.
*B23K 26/08* (2014.01)
*B23K 26/082* (2014.01)
*C21D 1/09* (2006.01)
*B23K 37/02* (2006.01)
*B23K 26/06* (2014.01)
*B23K 26/352* (2014.01)
*C21D 1/06* (2006.01)
*B23K 101/00* (2006.01)
*B23K 103/04* (2006.01)

(52) U.S. Cl.
CPC ........ *B23K 26/083* (2013.01); *B23K 26/0823* (2013.01); *B23K 26/0869* (2013.01); *B23K 26/352* (2015.10); *B23K 37/0235* (2013.01); *C21D 1/06* (2013.01); *C21D 1/09* (2013.01); *C21D 9/30* (2013.01); *B23K 2101/005* (2018.08); *B23K 2103/04* (2018.08)

(58) Field of Classification Search
CPC ............ B23K 26/0823; B23K 26/0869; B23K 26/352; B23K 26/083; B23K 26/082; B23K 2103/04; B23K 2101/005
See application file for complete search history.

(56) References Cited

U.S. PATENT DOCUMENTS

| | | | |
|---|---|---|---|
| 2005/0237895 A1 | | 10/2005 | Tanaka et al. |
| 2008/0229877 A1* | | 9/2008 | Iwasaki ............. B23K 26/0604 74/595 |

FOREIGN PATENT DOCUMENTS

| | | |
|---|---|---|
| CN | 103484653 A | 1/2014 |
| DE | 3905551 A1 | 8/1990 |
| DE | 4123577 A1 | 1/1993 |
| DE | 102005005141 B3 | 6/2006 |
| EP | 1308525 A2 | 5/2003 |
| EP | 2309126 A1 | 4/2011 |
| GB | 2015813 A | 9/1979 |
| JP | S53113233 A | 10/1978 |
| JP | 627821 A | 1/1987 |
| JP | 2004084931 A | 3/2004 |
| JP | 2008202438 A | 9/2008 |

OTHER PUBLICATIONS

H. Hagino et al. "Design of a computer-generated hologram for obtaining a uniform hardened profile by laser transformation hardening with a high-power diode laser", Precision Engineering, 2010, vol. 34, pp. 446-452.
M. Seifert et al. "High Power Diode Laser Bean Scanning in Multi-Kilowatt Range", Proceedings of the 23rd International Congress on Applications of Lasers and Electro-Optics, 2004.
S. Safdar et al. "An Analysis of the Effect of Laser Bean Geometry on Laser Transformation Hardening", Journal of Manufacturing Science and Engineering, Aug. 2006, vol. 28, pp. 659-667.
S.M. Shariff, et al., "Laser Surface Hardening of a Crankshaft", SAE 2009-28-0053 (SAE International); 2009; pp. 1-11.
International Search Report re: Application No. PCT/EP2015/052879 dated May 26, 2015; pp. 1-6; citing: DE 41 23 577 A1, DE 10 2005 005141 B3, DE 39 05 551 A1, US 2005/237895 A1, JP S62 7821 A and GB 2 015 813 A.
International Preliminary Report on Patentability dated Jun. 21, 2016 re: Application No. PCT/EP2015/052879; pp. 1-17; citing: DE 10 2005 005141 B3 and DE 41 23 577 A1.
Written Opinion re: Application No. PCT/EP2015/052879 dated May 26, 2015; pp. 1-11; citing: DE 39 05 551 A1, DE 10 2005 005141 B3 and DE 41 23 577 A1.
CN Office Action dated Nov. 6, 2017 re: Application No. 201580013179.7; pp. 1-23; citing: CN103290176A, DE4123577A1, DE102005005141B3, CN103215411A and CN103484653A.
JP Office Action dated Feb. 27, 2019 re: Application No. 2016-555828, pp. 1-7, citing: JP S53-113233 A and JP 2004-084931 A.

* cited by examiner

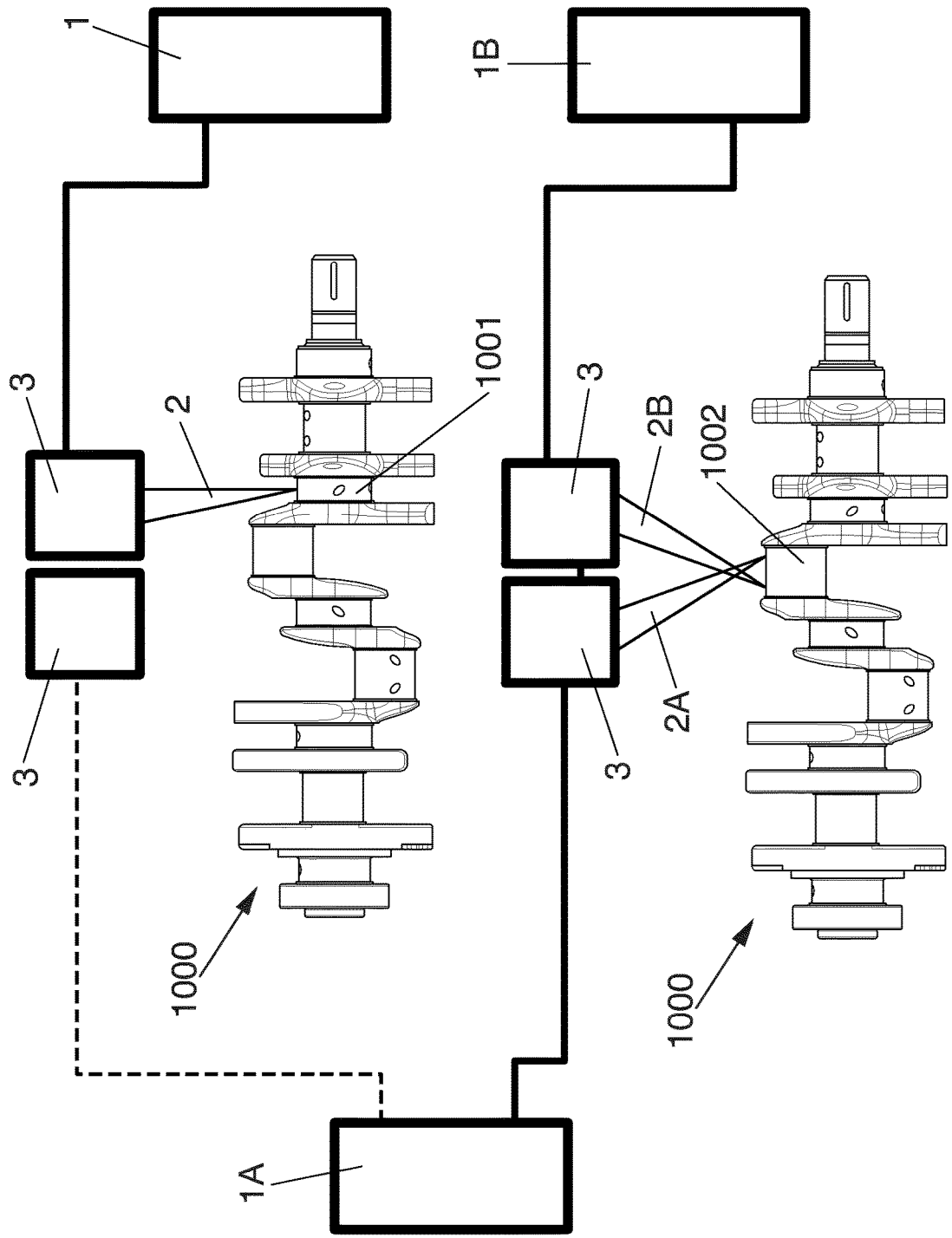

METHOD AND SYSTEM FOR LASER HARDENING OF A SURFACE OF A WORKPLACE

TECHNICAL FIELD

The present disclosure is related to the field of surface hardening of products of ferrous materials such as steel, for example, crankshafts, by laser.

BACKGROUND

It is well known in the art to harden ferrous materials, such as medium carbon steel, by heating the material to a high temperature, below its melting temperature, and subsequently quenching it, that is, cooling it rapidly enough to form hard martensite. Heating can take place in furnaces or by induction heating, and cooling can take place by applying a cooling fluid, such as water or water mixed with other components.

Often, it is only the surface that needs to be hardened. Surface hardening increases the wear resistance of the material and can sometimes also be used to increase fatigue strength caused by residual compressive stresses. Surface hardening can be useful for hardening surfaces that will be subjected to substantial wear when in use, for example, bearing surfaces, such as journal surfaces of crankshafts.

Laser surface hardening is a method of surface treatment in which high energy laser light is employed as a heat source to harden the surface of a substrate. It is known to use laser light to achieve surface hardening, cf., for example:

F. Vollertsen, et al., "*State of the art of Laser Hardening and Cladding*", Proceedings of the Third International WLT-Conference on Lasers in Manufacturing 2005 Munich, June 2005;

M. Seifert, et al., "*High Power Diode Laser Beam Scanning in Multi-Kilowatt Range*", Proceedings of the 23$^{rd}$ International Congress on Applications of Lasers and Electro-Optics 2004;

S. Safdar, et al., "*An Analysis of the Effect of Laser Beam Geometry on Laser Transformation Hardening*", Journal of Manufacturing Science and Engineering, August 2006, Vol. 128, pp. 659-667;

H. Hagino, et al., "*Design of a computer-generated hologram for obtaining a uniform hardened profile by laser transformation hardening with a high-power diode laser*", Precision Engineering 34 (2010), pp. 446-452;

U.S. Pat. No. 4,313,771-A;
DE-4123577-A1;
EP-1308525-A2;
EP-2309126-A1;
JP-2008-202438-A;
JP-S61-58950-A;
U.S. Pat. No. 4,797,532-A.

Using laser light for surface hardening involves several advantages: the laser beam is essentially independent of the workpiece, is easily controlled, requires no vacuum, and generates no combustion products. Also, as the laser beam generally only heats the metal product or workpiece locally, the rest of the workpiece can act as a heat sink, assuring rapid cooling, which is also known as self-quenching: the cold interior of the workpiece constitutes a sufficiently large heat sink to quench the hot surface by heat conduction to the interior at a rate high enough to allow martensite to form at the surface. Thus, the need for external cooling media, such as cooling fluids, can be obviated.

One problem involved with the use of laser light as the heat source in metal hardening processes is that the width of the hardening zone is limited by the dimensions of the laser spot. It is known to use optics to modify the shape of the spot, for example, to provide a substantially rectangular spot having a more or less uniform intensity distribution. As an alternative, scanning means (such as a scanning mirror associated with drive means) can be used to repetitively move the spot over the track, so that the heat source can be considered a rectangular source moving along the track.

In spite of its advantages, laser hardening is often not used because it is believed that the production rate will not be high enough for many practical applications of this technique, and because it difficult to achieve that all the parts that are to be heated will be heated to the desired extent. Correct heating is essential to make sure that hardening and tempering is achieved, with the necessary depths, but without causing damage by overheating.

For example, a crankshaft (the part of the engine that translates reciprocating linear piston motion into rotation) is a complex product that has often been conceived as difficult to harden by laser light. An example of a crankshaft is shown in FIG. 1. The crankshaft 1000 is a forged or casted steel product, having two or more centrally-located coaxial cylindrical journals 1001 (also known as the "main journals") and one or more offset cylindrical crankpin journals 1002 (also known as "rod journals"), separated by counterweights and webs that establish walls 1005 extending substantially perpendicularly to the surfaces of the journals. The complex shape of the product can make it difficult to correctly "scan" the surface with the laser beam; the tracks or areas to harden can have different widths and/or be asymmetric and/or be arranged in different planes (which is the case with the walls 1005 and the surfaces of the journals 1001 and 1002). Thus, today, high-frequency induction heating followed by a polymer-based water quench process is frequently used for the hardening of crankshafts. However, this process, although proven to be useful for achieving the desired hardening, involves certain drawbacks. For example, the inductors for creating heating by induction have to be designed in accordance with the specific design of the crankshaft, which reduces flexibility: to adapt an induction machine to a new kind of crankshaft can be time-consuming and costly. Further, heating by induction is costly in terms of the energy required to heat the crankshaft to the desired extent. Additionally, the cooling process is complex, costly and challenging from an environmental point of view, due to the use of large amounts of cooling fluid that are needed. Besides, parameters such as cooling fluid temperature and flow have to be carefully controlled to ensure a correct hardening process.

Thus, hardening using laser light as the heat source can be an attractive alternative in terms of flexibility, environmental-friendliness, energy consumption, and costs.

DE-10 2005 005 141-B3 discloses a method for laser hardening of the surfaces of the journals of a crankshaft. According to this method, a six-axis industrial robot is used to hold the crankshaft and to subsequently rotate it around the axis of the main journals and around the axes of the rod journals, during heating of the respective journals with laser light. Thus, by using the capacities of movement of the industrial robot, the distance between the laser source and the surface onto which the laser beam is projected can be kept constant.

Also US-2004/0244529-A1 teaches the use of laser to harden a small region of a crankshaft. In this case, laser light is used to harden a plurality of spaced portions, wherein the extent of the portions varies over the region to be hardened. As only a minor portion of the crankshaft is hardened with these spaced portions, there is no need to concern about overheating of other, more heat sensitive portions.

DE-3905551-A1 teaches a system for hardening of a surface of a crankshaft, where a laser beam is projected onto a crankshaft and wherein there is a relative movement between the beam and the crankshaft such that the beam will subsequently be projected onto different portions of the crankshaft. The power or power distribution in the beam is adapted depending on the geometry of the respective portion of the crankshaft and depending on the desired depth of penetration of the laser beam. A problem with the approach taught by DE-3905551-A1 is that it may not allow for a high production rate. To achieve a sufficient depth of the hardened layer (in the motor industry, typically hardening depths of at least 800, 1000, 1500, 2000 or even 3000 µm are required in terms of effective case depth, and it is often desired to have 100% transformed martensite until depths of 200 µm or more), it is not enough to raise the temperature of a certain portion of the surface, but energy has to applied for a sufficiently long time to heat not only the surface, but also the material under the surface, to a sufficient depth. As an excessive heating of the surface is not desired, to achieve the desired penetration the best solution is not to simply increase the amount of power of the laser beam, but rather the time during which the laser heating is applied to the relevant area. In the system disclosed in DE-3905551-A1, where the laser beam is kept stationary and applied to a specific area, obtaining an adequate heating and penetration over the major portions of the main journals or rod journals would appear to require substantial amounts of time. Thus, DE-3905551-A1 may describe a method appropriate for hardening very specific portions of the surface of a crankshaft, but not for hardening the general surfaces of the journals.

Also EP-1972694-A2 focuses on the hardening of specific portions of a crankshaft, namely, of the fillet portions, using one or more lasers. The laser light is directed onto the portion to be hardened and the crankshaft is rotated. The disclosed method can include a pre-heating step, a main heating step, and a post-heating step. It appears that the laser irradiation is maintained constant while rotation of the crankshaft takes place. EP-1972694-A2 is silent on the risk of overheating of more heat sensitive portions of the surface of the crankshaft.

US-2004/0108306-A1 acknowledges that automakers use the induction heating process to harden the bearings of a crankshaft, that is, the surfaces of the main journals and the rod journals, while a mechanical rolling process is utilized to roll the fillets to improve compressive stresses. However, according to US-2004/0108306-A1, these processes are said to be capital-intensive, time-intensive, lead to nonuniformities, and have a crack propensity in the oil lubrication holes that require a tempering process. US-2004/0108306-A1 teaches a fillet heat treatment by laser which aims at eliminating the need for the mechanical rolling process. Closed-loop temperature control by using an optical pyrometer is proposed. The use of a controllable x,y mechanism for maintaining a fixed heating distance between laser and fillet is proposed.

S. M. Shariff, et al., "*Laser Surface Hardening of a Crankshaft*", SAE 2009-28-0053 (SAE International), discusses the laser surface hardening of a crankshaft aiming at a hardened case-depth of above 200 µm with a hardness of 500-600 HV at different locations mentioned. The document mentions the problem of melting at the periphery of holes due to reduced heat-sink effect and accumulation of heat at the edge. It is stated that the problem can be dealt with by reducing the pre-heating effect at the hole-edge by choosing an appropriate start-up location and varying process parameters within the permissible range.

One reason for which laser hardening has not become more frequently used in the context of complex products such as crankshafts is that it is believed that it can be difficult to achieve a correct heating of the parts, that is, a sufficient heating to assure correct hardening (generally the hardened layer has to have an effective case depth of at least 800 µm or more, such as at least 1000, 1500, 2000 µm or more, and/or featuring 100% transformed martensite until a depth such as 200 µm or more) while avoiding overheating of sensitive portions. For example, in the case of a crankshaft such as the one of FIG. 1, care must be taken in what regards the heating of the journals in correspondence with the oil lubrication holes 1003 and optionally also in what regards the fillets 1004. For example, if a large laser spot is simply projected onto the surface of the journal during rotation of the journal to heat the entire surface, and if the rotation speed and the power of the laser beam are kept constant so that each portion of the surface receives the same amount of energy, and if this energy is sufficient to achieve an adequate heating of the major part of the surface to produce the desired hardening, the heating may become excessive at the edges of the oil lubrication holes, thus damaging said edges. The same can occur at the fillets, which are commonly undercut; thus, there are edges that can suffer damage if overheated.

SUMMARY

A first aspect of the disclosure relates to a method of laser hardening of a surface of a workpiece, the workpiece comprising at least one surface area to be hardened, the method comprising:

projecting a laser beam from a laser source onto said surface area, so as to produce a laser spot (that is, what can be referred to as an actual laser spot) on said surface area;

generating a relative movement between the surface of the workpiece and the laser source (for example, by displacing the workpiece and/or the laser source; this displacement can, in some embodiments of the disclosure, include, for example, rotation of the workpiece), thereby allowing the laser spot to subsequently be projected onto different portions of said surface area;

during said relative movement, repetitively scanning the laser beam across the respective portion of said surface area in two dimensions, following a scanning pattern so as to produce a two-dimensional equivalent or effective laser spot on said surface area, said effective laser spot having an energy distribution. This energy distribution will depend on parameters such as the power of the actual laser spot, the scanning pattern, and the velocity with which the laser spot is scanned along the different portions or segments of the scanning pattern.

Due to the relative movement, said effective laser spot travels along said surface area, for example, in a first direction, such as, in the case of the hardening of the journal of a crankshaft, in a circumferential direction of the journal of the crankshaft.

This kind of arrangement is disclosed in the international patent application PCT/EP2013/067949 by the same applicant, the contents of which are incorporated herein by reference. This arrangement is advantageous in that it allows, inter alia, the energy distribution along and across the effective laser spot to be dynamically adapted while the effective laser spot is travelling along the surface area to be hardened, by adapting, for example, one or more of the parameters indicated above, such as the layout of the scanning pattern (such as the number, orientation and/or length of segments of the scanning pattern) and/or the velocity with which the laser spot is displaced along the scanning pattern, such as along different portions or segments of the scanning pattern. For example, different velocities can be assigned to different segments, and the layout of the scanning pattern and/or the velocity assigned to one or more of the segments can be modified while the relative movement of the effective laser spot along the surface area to be hardened is taking place. Thereby, the energy distribution can be adapted to take into account certain more heat sensitive subareas. A typical example of such a more heat sensitive subarea is the area adjacent to an oil lubrication hole of a journal of a crankshaft.

In accordance with this aspect of the disclosure, the scanning pattern comprises at least three segments, and said scanning of the laser beam is carried out so that said laser beam or actual laser spot follows at least one of said segments more frequently than it follows at least another one of said segments. This arrangement is advantageous in that it enhances flexibility and the way in which the scanning pattern can be used to provide an adequate and, whenever desired, symmetric or substantially symmetric energy distribution. For example, one of said segments can be used as a path or bridge followed by the laser spot when moving between two other segments, so that the transfer of the laser spot between different portions (such as an end and a beginning) of the scanning pattern can be carried out using segments (such as intermediate segments) of the scanning pattern for the transfer, whereby the transfer can often be carried out without turning off the laser beam and without distorting the symmetry of the two-dimensional energy distribution, when such symmetry is desired.

In some embodiments of the disclosure, the scanning pattern comprises at least three substantially parallel straight or curved lines distributed one after the other in a first direction, said lines generally extending in a second direction, wherein said at least three lines comprise a first line, at least one intermediate line, and a last line arranged one after the each other in said first direction, wherein said scanning of the laser beam is carried out so that said laser beam or actual laser spot follows said intermediate line more frequently than said laser beam follows said first line and/or said last line. That is, for example, the laser beam can on an average follow said intermediate line twice as often as it follows said first line and said last line, for example, the laser beam can travel along the intermediate line each time it moves from the first line towards the last line, and vice-versa. That is, the intermediate line or lines can serve as a kind of bridge followed by the actual laser spot when moving between the first and the last line.

This arrangement has been found to be practical and easy to implement, and it has been found that adequate energy distributions can often be obtained by adapting scanning speed and without substantially adapting the power of the laser beam. It is also possible to modify the power of the laser beam during scanning so as to tailor the energy distribution, but rapid switching of the power is not always possible or desirable, and having the laser beam at a low power level or switched off during substantial parts of the scanning cycle may imply a sub-optimal use of the capacity of the laser. Thus, it is often desirable to operate with the laser beam fully in the on state, to take full advantage of the available power.

It is often desirable to use three or more lines arranged in this way, that is, one after the other in a direction different from, such as perpendicular to, the direction along which the lines extend, in order to achieve a substantial extension of the effective laser spot not only in the direction along the lines, but also in the other direction, so as to make the effective laser spot adequate for heating a sufficiently wide surface portion to a sufficiently high temperature and to maintain the temperature at the desired level or levels during sufficient time, while allowing the effective laser spot to travel with a sufficient speed, thereby allowing for a high productivity. Thus, a substantial extension of the effective laser spot in two dimensions is often an advantage.

In some embodiments of the disclosure, the scanning pattern comprises at least three substantially parallel lines or segments, distributed one after the other in a first direction, such as in the direction along which the effective laser spot travels during the hardening process, said lines extending in a second direction, such as in a direction perpendicular the first direction. In some embodiments of the disclosure, said at least three lines comprise a first line, at least one intermediate line, and a last line, arranged after each other in said first direction, and the scanning of the laser beam is carried out so that the laser spot is scanned along said lines according to a sequence in accordance with which the laser spot, after following said first line, follows said intermediate line, said last line, said intermediate line, and said first line, in that order.

The above definition does not mean that the scanning has to start with the first line, but just indicates the sequence according to which the laser spot tracks or follows the above-mentioned lines of the scanning pattern. Also, it does not exclude that in between (such as before or after) following some or all of the lines indicated above, the effective laser spot may follow other lines, such as lines interconnecting the first, last and intermediate lines, and/or additional intermediate lines.

That is, in these embodiments, after moving along the first line, the laser spot always follows said intermediate line twice before moving along the first line again. Whereas a more straight-forward approach might have been to carry out the scanning so that after said last line the laser spot returns directly to said first line, it has been found that the sequence followed according to these embodiments of the disclosure is suitable to achieve a symmetric energy distribution about an axis of symmetry extending in said first direction.

In some embodiments of the disclosure, the scanning pattern comprises a plurality of said intermediate lines. The number of lines can be chosen by the operator or process designer or equipment designer depending on, for example, the size of the actual laser spot and the desired extension of the effective laser spot, for example, in the first direction. For example, a minimum number of lines can be three lines, but in many practical implementations a larger number of lines can be used, such as four, five, six, ten or more lines, when counting the first, the last and the intermediate lines. In some embodiments of the disclosure, the number of lines is modified to modify the energy distribution, while the effective laser spot is travelling along the surface area to be hardened.

In some embodiments of the disclosure, the laser spot is displaced with a higher velocity along said at least one intermediate line than along said first line and last line. This is often preferred in order to achieve an adequate energy distribution in said first direction, at least during a portion or a substantial portion of the hardening process. The higher velocity of the laser spot when moving along the intermediate lines, or at least when moving along one or some of them, compensates for the fact that the laser spot moves along said intermediate lines twice as often as it moves along the first and last lines. For example, the velocity of the laser spot along the intermediate lines can in some embodiments of the disclosure be about twice the velocity of the laser spot along the first and/or last lines. The velocity can be different for different intermediate lines. The velocity for each line can be chosen in accordance with a desired energy distribution in the first direction. Now, the velocity with which the effective laser spot is displaced along different lines or segments of the scanning pattern can be dynamically modified while the effective laser spot is travelling along the surface area to be hardened, for example, to adapt the energy distribution to avoid overheating of more heat sensitive subareas.

In some embodiments of the disclosure, the scanning pattern further comprises lines extending in said first direction, between the ends of the first, last and intermediate lines, whereby said laser spot follows said lines extending is said first direction when moving between said first line, said intermediate lines and said last line. In some embodiments of the disclosure, the laser spot is displaced with a higher velocity along said lines extending in the first direction, than along said first line and said last line, at least during part of the hardening process.

In some embodiments of the disclosure, the laser spot is displaced along said scanning pattern without switching the laser beam on and off and/or while maintaining the power of the laser beam substantially constant. This makes it possible to carry out the scanning at a high speed without taking into account the capacity of the laser to switch between different power levels, such as between on and off, and it makes it possible to use laser equipment that may not allow for very rapid switching between power levels. Also, it provides for efficient use of the available output power, that is, of the capacity of the laser equipment in terms of power.

In some embodiments of the disclosure, the workpiece is a crankshaft.

Another aspect of the disclosure relates to a method of laser hardening of surfaces of journals of a crankshaft, said crankshaft having at least a first journal having a first width and at least a second journal having a second width, said second width being larger than said first width, each of said journals comprising a surface area to be hardened, said surface area extending in a first direction corresponding to a circumferential direction of the journal, and in a second direction parallel with an axis of rotation of the crankshaft. The method comprises:

A) during at least one stage of the method, or stage of a process of hardening of a crankshaft using said method, simultaneously projecting a laser beam from a first laser source and a laser beam from a second laser source onto said surface area of said second journal; and B) during at least another stage of the method or process, projecting a laser beam from said first laser source onto said surface area of said first journal, while simultaneously projecting a laser beam from said second laser source onto another portion (such as another journal, such as another first journal) of a crankshaft, which can be the same or a different crankshaft.

The use of two lasers sources/beams, in accordance with this second aspect of the disclosure, is beneficial in that it allows for an increase in the efficiency in terms of use of the available laser power during the hardening process. If only one laser is used, it is necessary to use a laser having an adequate power to allow it to provide an effective laser spot with an energy distribution suitable for hardening the surface of a crankshaft, and with a size that extends across the major part also of the journals having the second width—that is, the widest journals to be hardened—while, on the other hand, also extending sufficiently in the circumferential direction to allow for a sufficiently high travelling speed of the effective laser spot in said circumferential direction—due to the relative movement discussed above—while at the same time allowing the relevant parts of the journal to be heated for a sufficiently long time, without excessive non-desired energy fluctuations. Such lasers may be available, but the problem is that a laser having this capacity and power, may not be used efficiently when it is used to harden the surfaces of the journals that have the first width, that is, the smaller width. That is, for example, in the case of a journal such as the one of FIG. 1, a laser adequate for hardening, by itself, the surfaces of the rod journals (which are about twice as wide as the main journals) in an efficient manner and at a speed implying high productivity, will be used in a sub-optimal manner when it is used to harden a main journal.

Thus, the use of two laser sources, which can be adapted so that their capacity/power is sufficient so that each of them can be used for adequate and efficient hardening of the journals having a first width (the smaller one) with a desired speed in terms of finished journals per unit of time, and which can be used together for hardening the journals having the second width (the larger one) with a desired speed, allows for a more efficient use of the available laser power. When the two-dimensional energy distribution of each effective laser spot is determined by scanning the laser spot along the scanning pattern, the same can apply to the scanning equipment: two smaller or simpler scanning patterns can be combined to form the desired energy distribution, in a way that would require a larger or more complex scanning pattern if only one laser and associated scanning means were used.

In some embodiments of the disclosure, the method comprises:

A) during at least one stage of the method, projecting a laser beam from a first laser source onto said surface area of said second journal, so as to produce an effective laser spot on said surface area, said effective laser spot extending, in said second direction, across a first portion of the surface area to be hardened, and projecting another laser beam from a second laser source onto said surface area of said second journal, so as to produce an effective laser spot on said surface area, said effective laser spot extending, in said second direction, across a second portion of the surface area to be hardened, wherein said first portion and said second portion together extend across the major part of said surface area to be hardened;

B) during at least another stage of the method, projecting a laser beam from said first laser source onto said surface area of said first journal, so as to produce an effective laser spot on said surface area, said effective laser spot extending, in said first direction, across the major part of the surface area to be hardened;

during both of said stages of the method, generating a relative movement between the surface of the crankshaft and the laser source in said circumferential direction, so as to subsequently project the effective laser spots onto different portions of said surface areas in the circumferential direction;

said effective laser spots featuring a two-dimensional energy distribution.

This two-dimensional energy distribution can be fixed or it can be adapted dynamically, for example, to accommodate for more or less heat sensitive subareas. For example, the effective laser spot can be established by scanning an actual laser spot across the respective portion of said surface area in two dimensions, following a scanning pattern so as to produce a two-dimensional equivalent or effective laser spot on said surface area, said effective laser spot having a two-dimensional energy distribution which depends on parameters such as scanning speed (the speed with which the laser spot moves along the different parts or segments of the scanning pattern), power of the laser spot and variation in the power along the scanning pattern, layout of the scanning pattern, size of the laser spot, etc. One or more of these parameters can be adapted dynamically while the effective laser spot is travelling around the circumference of the respective journal, so as to adapt the energy distribution when, for example, the effective laser spot approaches a heat sensitive area, such as the area adjacent to an oil lubrication hole. This and related concepts are disclosed in the international patent application PCT/EP2013/067949 by the same applicant, the contents of which are incorporated herein by reference.

In some embodiments of the disclosure, the first portion is placed substantially adjacent said second portion, without any substantial overlap between the two portions. For example, the overlap can be less than 5, 10, 20 or 30%; it can in some embodiments be zero or almost zero.

In other embodiments of the disclosure, the first portion and the second portion are substantially overlapping with each other. For example, the overlap can be more than 70, 80 or 90%, such as 100%.

That is, the first portion and the second portion can be separate non-overlapping portions, but they can also overlap with each other. In some embodiments of the disclosure, the first and the second portions are substantially or totally overlapping in space. What is important is that the combined effect of the two laser beams produces a total two-dimensional energy distribution that has a sufficient extension in the first and the second direction, and with a sufficient energy density in terms of applied power per unit area, to allow the journal to be hardened efficiently and with quality (for example, without excessive non-desired energy fluctuations within the effective laser spot) and with the effective laser spot travelling at a sufficient speed in the circumferential direction, to achieve a high productivity in terms of products per hour.

In some embodiments of the disclosure, during at least one stage of the method, the laser beam from the first laser source is projected onto a journal of one crankshaft, and the laser beam from the second laser source is projected onto a journal of another crankshaft. In many cases, a crankshaft will have a number of journals that will be sub-optimal in terms of efficiency of use of the available laser power. For example, when two laser sources are used to harden, together, the wider journals, and to harden, separately, the less wide journals, when the number of less wide journals is not even, during one sequence or step of hardening of journals one laser source will remain idle. For example, in the case of a crankshaft as per FIG. 1, there are four wide rod journals but there can be five less wide main journals. The two laser sources can be used simultaneously for hardening each of the rod journals, and can be used separately to harden the different main journals, so that two main journals can be hardened simultaneously. However, after hardening four of the main journals, the fifth one will remain, and one of the laser sources is sufficient to harden it. To enhance efficiency, the other laser source, instead of remaining idle, can then be used to harden a main journal of a second crankshaft. This can serve to additionally enhance efficiency of use of the equipment.

In some embodiments of the disclosure, during at least one stage of the process, two journals having the first width are hardened in one step, and one journal having the second width is hardened in another step, said two steps following one after the other, and without any relative movement between the laser sources and the crankshaft, in the second direction, between said two steps. This can speed up the process, as it can reduce the time between the two steps.

In some embodiments of the disclosure, said surface area comprises at least one more heat sensitive subarea and at least one less heat sensitive subarea, wherein said energy distribution is adapted so that it is different in a more heat sensitive subarea, such as the area adjacent to an oil lubrication hole of a crankshaft, than in a less heat sensitive subarea, so as to prevent overheating of said more heat sensitive subarea.

A further aspect of the disclosure relates to a method for hardening surface areas, such as surface areas of journals, of at least two crankshafts, the method comprising:

during at least one stage of the method or process, simultaneously using a laser beam from a first laser source and a laser beam from a second laser source for hardening a first one of said crankshafts, for example, by applying the laser beams to the same or to different journals of the crankshaft; and during at least another stage of the method, simultaneously using a laser beam from the first laser source for hardening said first one of said crankshafts and a laser beam from the second laser source for hardening a second one of said crankshafts.

This has been found to be advantageous for increasing flexibility and efficiency, reducing or avoiding any idle time of laser equipment. One or more laser sources can thus be shared between a plurality of crankshafts. This is especially advantageous in the case of a product having a configuration such as a crankshaft, with a complex layout involving a plurality of journals, often having different widths.

In some embodiments of the disclosure, the method includes, during at least one stage of the method or process, simultaneously using a laser beam from a first laser source and a laser beam from a second laser source for hardening the first one of said crankshafts, while using a laser beam from a third laser source for hardening said second one of said crankshafts.

A further aspect of the disclosure relates to an apparatus for hardening a surface area of a workpiece, the apparatus comprising at least one laser source arranged to project an effective laser spot onto the surface area, and means for generating relative movement between said surface area and the effective laser spot so that said effective laser spot is moved along said surface area so as to subsequently and progressively heat different portions of said surface area to a temperature suitable for hardening. The apparatus is arranged—for example, by means of a suitably programmed control system—to operate so as to carry out one or more of the methods described above.

In some embodiments of the disclosure, the apparatus comprises at least two laser sources and is arranged for hardening, at one stage of a process of hardening surfaces of journals of a crankshaft, one journal by applying laser beams from both of said laser sources to said journal, and at another stage of said process, two journals by applying a laser beam from a first one of said laser sources to one of said journals, and a laser beam from the other one of said laser sources to another one of said journals.

In some embodiments of the disclosure, the machine, apparatus or system can comprise two or more laser sources arranged to operate on at least two crankshafts during at least one phase of the hardening process. For example, the machine can comprise at least three laser sources, arranged so that during at least one stage of the hardening process, laser beams from two of these three laser sources are used for hardening a first one of the crankshafts and a laser beam from one of said laser sources is used for hardening a second one of said crankshafts, whereas during at least another stage of the hardening process, a laser beam from one of these three laser sources is used for hardening the first one of the crankshafts and laser beams from two of said laser sources are used for hardening the second one of said crankshafts.

In some embodiments of the disclosure, during at a substantial part (such as at least 50%, 75%, 90%, 95% or more) of the time of application of the effective laser spot onto the surface area, the effective laser spot has a width (or linear extension, along the curvature of the surface of the journal) in the circumferential direction of at least 5 mm, preferably at least 7 mm, more preferably at least 10 mm, and even more preferably at least 15 mm, 20 mm, 30 mm or more, such as at least 50 mm. Using a sufficient extension in the circumferential direction, that is, in the direction of the relative movement produced between the laser source and the surface of the journal, makes it possible to heat each portion of the surface area to be hardened for a sufficient time, while completing the hardening process within a reasonably short time. That is, a sufficient extension of the effective laser spot in the circumferential direction makes it possible to carry out the relative movement at a relatively high speed while achieving a sufficient penetration or hardening depth, without using excessively high temperatures. For this reason, a substantial width of the effective laser spot in the circumferential direction can be preferred. Of course, a balance has to be struck between the capacity in terms of power of the laser used, and the surface area covered by the effective laser spot, as the available power must be sufficient to provide sufficient heating of the area. It has been found that when working with automobile crankshafts having journals with widths in the order of one or a few cm in the first direction, and using lasers having an output power in the range of a couple of kW such as 3-4 kW, the effective spot can, for example, have a width in the circumferential direction in the order of 1 cm while the linear relative velocity between the laser and the surface of the journal can be in the order of 60 cm/minute. For many industrial purposes, it is considered that the laser beam should have a power of at least 3 kW, preferably more, such as 6 kW.

In some embodiments of the disclosure, said effective laser spot is an equivalent or virtual laser spot obtained by scanning the laser beam in the first direction and in the second direction, including directions in between these two directions, that is, directions that are oblique to the first and second directions, for example, along a straight or curved path or lines, repetitively following a scanning pattern along which the laser spot is displaced with a scanning speed, so that the two-dimensional energy distribution during a scanning cycle is determined by said scanning speed, said scanning pattern, size of the laser spot, power of the laser beam and power distribution within the laser beam. Thus, one or more of these parameters can be used to dynamically adapt the two-dimensional energy distribution. This makes it possible to easily adapt and modify the size and the shape of the effective laser spot, as well as the two-dimensional energy distribution within the effective laser spot, during the relative displacement between the laser source and the surface of the workpiece, that is, for example, during rotation of the crankshaft around its longitudinal axis, thereby adapting the two-dimensional energy distribution so as to avoid overheating of the more heat-sensitive subareas such as the areas adjacent to the oil lubrication holes. In some embodiments of the disclosure, adaptation of the energy distribution is carried out by adapting at least one of said scanning speed, scanning pattern, size of the laser spot, power of the laser beam and power distribution within the laser beam, so that said energy distribution is different when heating said less heat sensitive subarea than when heating said more heat sensitive subarea including the area adjacent to an oil lubrication hole, so as to avoid overheating of said area adjacent to an oil lubrication hole. In some embodiments of the disclosure, adaptation of the energy distribution is carried out by adapting the power of the laser beam, for example, by turning the laser beam on and off during scanning of the laser spot along the scanning pattern. For example, when using a laser such as a fiber laser, the laser beam can be switched on and off very rapidly, thus making it possible to obtain a desired energy distribution by turning the laser beam on and off while following the scanning pattern. Thus, heating can be achieved by turning the laser beam on during certain lines or parts of lines of the scanning pattern.

In some embodiments of the disclosure, adaptation of the energy distribution can be (further) carried out by adapting the scanning speed during scanning of the laser spot along the scanning pattern. For a fixed laser beam power, a higher speed implies that less energy is applied, and vice-versa.

In some embodiments of the disclosure, scanning is carried out at a scanning speed sufficiently high so that the temperature oscillations at points within said effective laser spot have an amplitude of less than 200° C., preferably of less than 150° C., more preferably of less than 100° C., and even more preferably of less than 50° C., between a local maximum and the following local minimum of the temperature. In this context, the amplitude of the oscillations refers to the amplitude of the repetitive variations between local maxima and minima of the temperature curve, excluding the initial substantial heating to a maximum temperature at the leading edge of the effective laser spot and the subsequent cooling to a low temperature at the trailing edge of the effective laser spot. For an appropriate hardening, it is desirable that the metal rapidly reaches a sufficiently high temperature and that the metal subsequently stays at said sufficiently high temperature for a reasonable amount of time, without substantial fluctuations in said temperature, as such fluctuations may negatively affect the quality of the hardening. Scanning speeds of more than 10, 25, 50, 75, 100, 150, 200 or 300 Hz (i.e., repetitions of the scanning pattern per second) can be appropriate, to prevent the temperature of a heated spot to sink too much before the spot is re-heated by the laser beam during the next scanning cycle. Adequate hardening requires certain minimum temperatures and if a desired hardening depth is to be reached rapidly, high temperatures are preferred. However, excessive temperatures can negatively affect the quality due to, for example, grain size growth. Thus, a compromise temperature has to be found, and deviations from this temperature should be as small as possible. Thus, a high scanning speed in terms of cycles per second can be preferred to reduce the amplitude of the temperature fluctuations or oscillations.

In some embodiments of the disclosure, said energy distribution features a higher energy density at a leading portion or edge of said effective laser spot than at a trailing portion or edge of said effective laser spot, such that an area swept by the effective laser spot is first receiving laser irradiation with higher average power and is subsequently receiving laser irradiation with lower average power. This increases efficiency in that an appropriate temperature for hardening is reached rapidly, so as to reduce the time during which the effective laser spot has to be applied to a certain area in order to achieve a required hardening depth. Thus, it takes less time to complete the hardening of, for example, the surface of a journal.

In some embodiments of the disclosure, the method comprises the step of using a different scanning pattern for the laser beam within said effective laser spot, in said more heat sensitive subarea compared to in said less heat sensitive subarea.

In some embodiments of the disclosure, the method comprises the step of adapting said energy distribution by adapting the scanning speed so that it is different in at least part of said effective laser spot, in said more heat sensitive subarea compared to in said less heat sensitive subarea.

In some embodiments of the disclosure, said effective laser spot comprises a leading portion with an energy distribution and density selected for heating a surface portion of the workpiece to a hardening temperature, an intermediate portion with an energy distribution and density (such as a very low energy density, such as zero power or close to zero power) selected so as to allow for cooling down of a heated surface portion for quenching, and a trailing portion having an energy distribution and density selected for heating the quenched portion so as to produce tempering thereof. Generally, many workpieces such as crankshafts require, in addition to hardening thereof, tempering so as to reduce hardness, enhance ductility and reduce brittleness. For tempering, the workpiece is to be heated to a temperature that is generally lower than the temperature used for hardening. When a workpiece has been hardened using a laser treatment, tempering can take place in a furnace or oven, but it is also possible to temper it applying a laser treatment similar to the one used for hardening, but with a different energy density and/or distribution. For example, in the case of a crankshaft, tempering can take place by applying a tempering cycle after the hardening cycle. For example, after hardening 360 degrees of a journal, the effective laser spot can once again be moved around or along the journal, this time for tempering it. However, it is also possible to provide for hardening and tempering in the same cycle or process step, by using an effective laser spot including: a leading portion for heating the surface of the workpiece to a desired hardening temperature and for maintaining the surface at said temperature for a sufficient time so as to obtain the desired hardening depth; an intermediate portion with a low energy density, such as an energy or power density of substantially 0 W/cm$^2$, so as to allow the heated portion to cool down so as to produce quenching or self-quenching thereof; and a trailing portion having an energy distribution and density to the extent necessary for tempering as desired. In this way, to produce both quenching and tempering it can be enough to let the effective laser spot sweep the surface to be treated once, for example, in the case of a surface of a journal of a crankshaft, by rotating the crankshaft once around its axis of rotation.

In the different aspects of the disclosure described above that include scanning of the laser beam or laser spot along and/or across a portion of the workpiece, this scanning can be carried out so that the laser spot repetitively follows a scanning pattern comprising a plurality of segments, and wherein at least one parameter value influencing said two-dimensional energy distribution is associated with each of said segments, for example, stored in a memory of a control system so as to be used to adapt the operation in correspondence with the respective segment each time the laser spot is moved along said segment. Said at least one parameter value can be dynamically adapted during operation so that said at least one parameter value is different for at least one of said segments when the effective laser spot is heating said more heat sensitive subarea than when heating said less heat sensitive subarea. For example, for a given segment different parameter values (or combinations of parameter values) can be stored in different memory locations, and depending on the subarea that is being heated, the parameter value can be withdrawn from one memory location or from another memory location. However, this is just an example, and also other implementations are within the scope of the disclosure. The use of a segmented scanning pattern has been found to make it easy to find and implement an energy distribution that is adapted to the specific design of a crankshaft. By adapting one or more parameters that influence the two-dimensional energy distribution, it is easy to modify the energy distribution in order to, for example, apply less power/energy in correspondence with more heat sensitive portions of the workpiece, such as the area around the edges of an oil lubrication hole of a crankshaft. Thus, an operator can, by assigning different values to certain parameters in correspondence to each segment, define different energy distributions, and by switching between different energy distributions during the hardening of a portion of a workpiece, such as the surface of a journal of a crankshaft, an adequate hardening can be achieved while avoiding local overheating of heat sensitive portions. The use of a segmented scanning pattern and the assignment of the parameter values on a per segment basis, makes it easy to find appropriate values, for example, with a few trial-and-error tests. For example, to accommodate for an oil lubrication hole, the values assigned to certain segments can be selected to reduce the energy applied adjacent to said oil lubrication holes, when the effective laser spot arrives at the corresponding subareas of the workpiece.

The parameter values can be indicative of at least one of scanning speed, size of the laser spot, power of the laser beam, power distribution within the laser beam, length of the corresponding segment and orientation of the corresponding segment. In many embodiments of the disclosure, the power of the laser beam and/or the scanning speed can be preferred parameters.

In some embodiments of the aspects of the disclosure described above, the method comprises the step of reducing the energy density at a leading portion of the effective laser spot when the effective laser spot is arriving at a previously hardened portion of said surface area, such as at a previously harden portion of a journal of a crankshaft hardened by displacing the effective laser spot around the journal in a circumferential direction. Thereby, undue heating of an already heated and hardened portion of the journal can be prevented. In some embodiments of the disclosure, power/energy density at the leading edge of the effective laser spot is merely reduced but the effective laser spot continues traveling, for example, around the journal in the circumferential direction, so as to reheat the hardened portion to a certain extent, for the purpose of tempering it. In other embodiments of the disclosure the method comprises the step of, when the effective laser spot is arriving at a previously hardened portion of said surface area, such as at a previously hardened portion of a journal of a crankshaft hardened by displacing the effective laser spot around the journal in a circumferential direction, interrupting the movement of said effective laser spot at a leading portion of said effective laser spot, whereas a trailing portion of said effective laser spot continues to move in said circumferential direction, thereby progressively reducing the size of said effective laser spot in said circumferential direction, until said effective laser spot vanishes. That is, the effective laser spot substantially stops when arriving at the previously hardened portion, that is, for example, the leading edge stops and the trailing edge catches up with the leading edge, completing the hardening cycle.

In both cases, the implementation of the method can be substantially facilitated if the effective laser spot is composed of segments, such as segments of a scanning pattern. The reduction or cancellation of the effective laser spot starting at its leading edge can be achieved by adapting the energy density at said segments, such as by reducing the power of the beam and/or increasing the scanning speed, and/or by simply cancelling or re-arranging segments. Thus, the segmented approach in combination with the use of bi-dimensional scanning of the laser beam to create the effective laser spot, provides for flexibility and makes it easy for the skilled person to handle, for example, in the case of laser hardening of journals of crankshafts in the circumferential direction, the arrival of the effective laser spot at the previously hardened portion of the track.

The different aspects described above can be combined with each other, whenever compatible with each other.

BRIEF DESCRIPTION OF THE DRAWINGS

To complete the description and in order to provide for a better understanding of the disclosure, a set of drawings is provided. Said drawings form an integral part of the description and illustrate different ways of carrying out the disclosure, which should not be interpreted as restricting the scope of the disclosure, but just as examples of how the disclosure can be carried out. The drawings comprise the following figures:

FIGS. 12A and 12B schematically illustrate how, in one possible embodiment of the disclosure, the apparatus or system can comprise two or more lasers, which can be shared between two or more crankshafts.

DETAILED DESCRIPTION OF THE DRAWINGS

Figure 1:
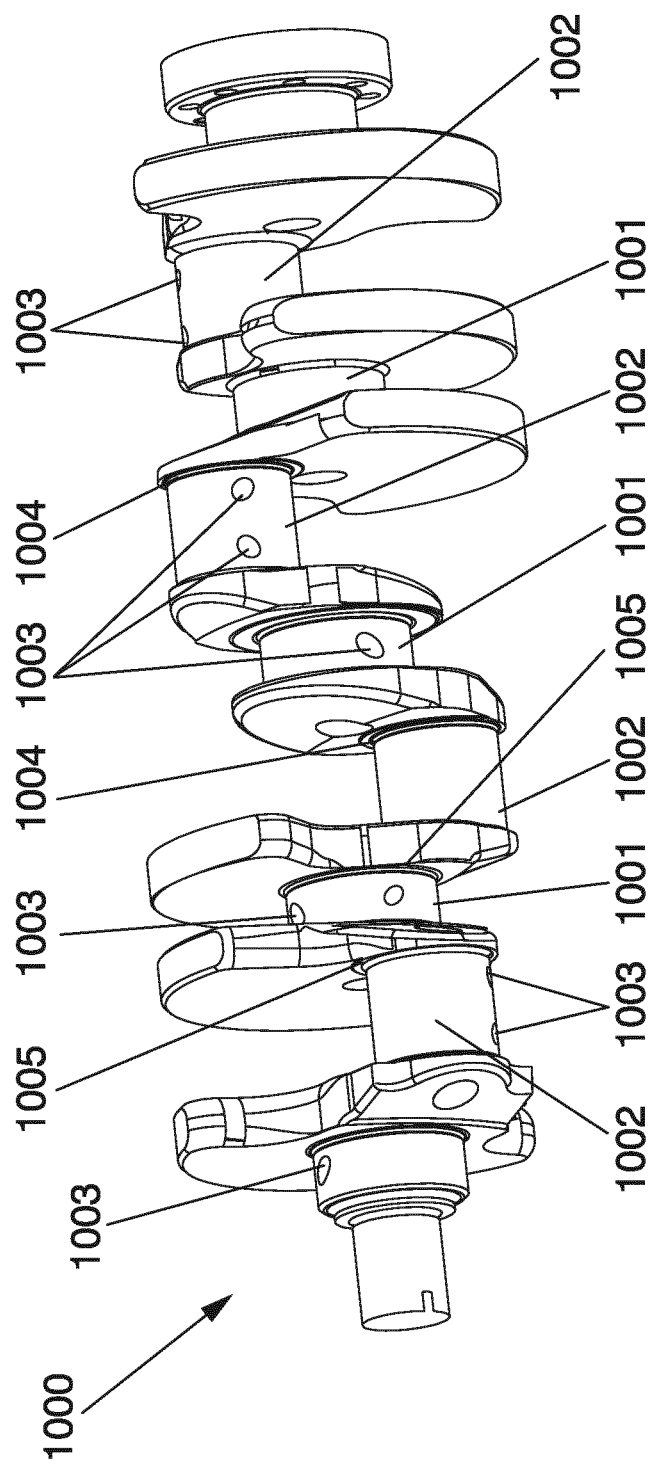
FIG. 1 is a schematic perspective view of a crankshaft, as known in the art.
Figure 2:
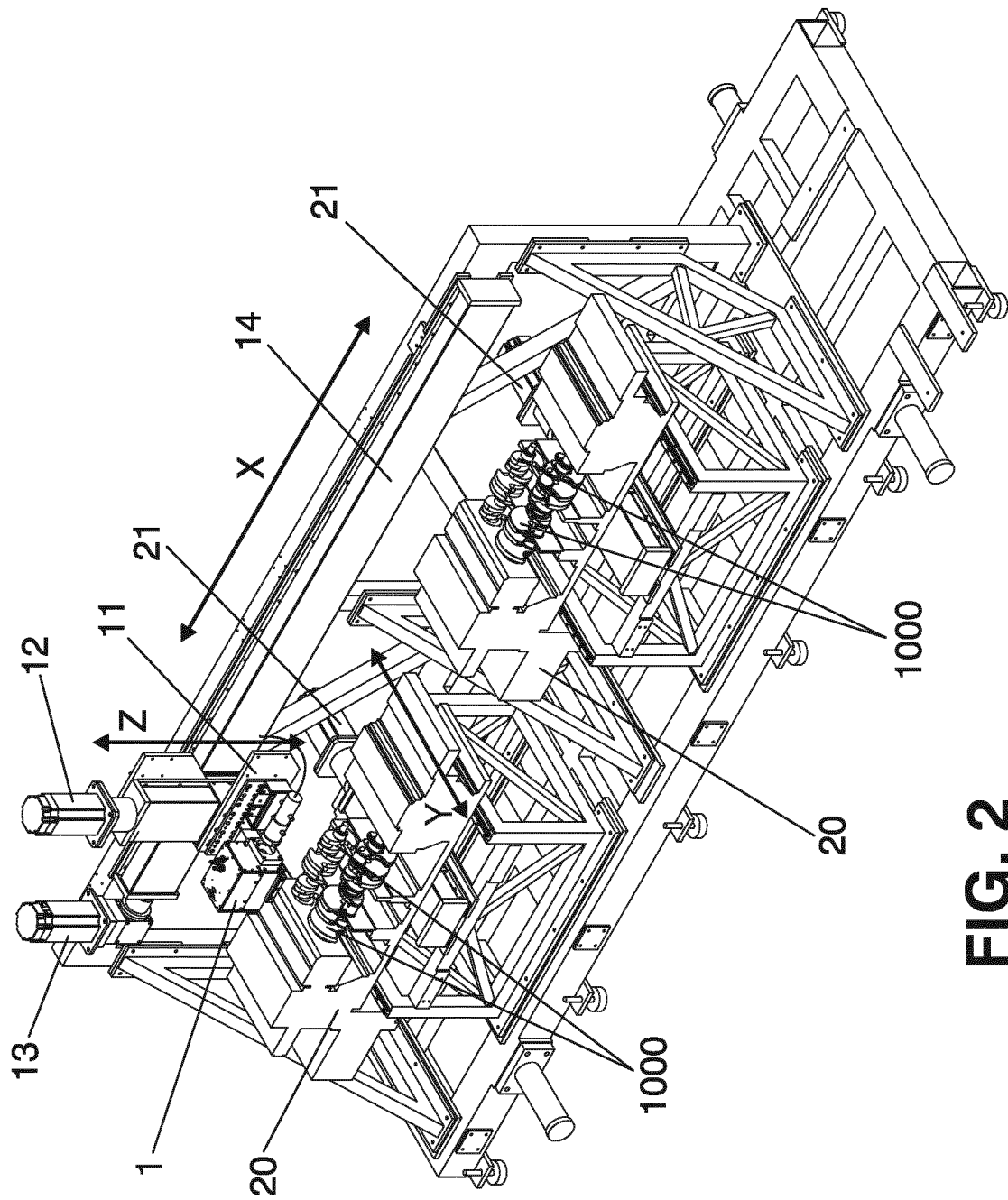
FIG. 2 is a schematic perspective view of a system in accordance with one possible embodiment of the disclosure.

FIG. 2 illustrates a system in accordance with one possible embodiment of the disclosure. The system comprises a frame structure accommodating a laser source 1 mounted on a laser carriage 11 which is displaceable in the vertical direction, in parallel with a vertical Z axis of the system, by first laser carriage drive means 12, for example, by a servomotor or any other suitable drive means. On the other hand, the laser source 1 can also be driven horizontally, in parallel with a horizontal X axis of the system, along a horizontal track 14, driven by second laser carriage drive means 13, such as another servomotor or other suitable drive means.

On the other hand, the system comprises two workpiece carriages 20, each workpiece carriage being able to accommodate two workpieces 1000 in parallel (in this embodiment, the workpieces are crankshafts), and including drive means (not shown) for rotating each workpiece along a central axis (in this embodiment, the central axis corresponds to the longitudinal axis passing through the centers of the main journals of the crankshaft), said axis being in parallel with the X axis of the system. On the other hand, each workpiece carriage 20 is associated with a workpiece carriage drive means 21 (such as a servomotor or any other suitable drive means) arranged to displace the workpiece carriage horizontally, in parallel with a Y axis of the system, perpendicular to the X axis.

The references to the horizontal and vertical directions are only used to simplify the explanation, and any other orientation of the axes is obviously possible and within the scope of the disclosure.

In the present case, the laser source 1 is first used to harden the relevant parts of the surface of one of the workpieces 1000 in a first one of the workpiece carriages 20, then it is used to harden the relevant parts of the surface of the other workpiece 1000 in said first one of the workpiece carriages 20, and then it is moved along the track 14 to face the second one of the work piece carriages 20, for hardening surfaces of the workpieces 1000 arranged therein. While the laser source 1 is operating on the workpieces in the second one of the workpiece carriages, the workpieces in the first one of the workpiece carriages can be unloaded and replaced by new workpieces to be treated by the laser source, and vice-versa.

Obviously, there are many alternative possibilities. For example, there may be only one workpiece per workpiece carriage, or there may be more than two workpieces per workpiece carriage. There may be one laser source per workpiece carriage (that is, a second laser source carriage with its corresponding laser source can be added to the track 14). Also, several arrangements as the one of FIG. 2, or variants thereof, can be placed in parallel. Also, each laser carriage 11 can be provided with more than one laser source 1, so that several workpieces in a workpiece carriage can be subjected to laser hardening treatment simultaneously. The relation between the number of laser sources, the number of workpiece carriages, and the number of workpieces, can be chosen so as to optimize the use of the more expensive parts of the system, and to optimize productivity, for example, by allowing for loading and unloading of workpieces without stopping the operation of the system. In some embodiments of the disclosure, a plurality of laser sources can be used to direct laser beams simultaneously to the same crankshaft, for example, to act simultaneously on different journals of the crankshaft or on the same journal of the crankshaft.

In some embodiments of the disclosure, when the workpiece is a crankshaft 1000 with main journals 1001 and rod journals 1002, during heat treatment of the main journals 1001 of the crankshaft, the laser source does not move in the Z axis direction and the workpiece carriage does not move in the Y axis direction, as the surface of the main journal is circular and symmetric around the axis of rotation of the crankshaft. In some embodiments of the disclosure, there may be a movement of the laser source and/or the workpieces along the X axis, if necessary to apply the laser heat treatment along the full extension of the main journal in the X axis direction. This depends on the power capacity of the laser source and on the capacity of the scanning means (not shown) to displace the laser beam in the X axis direction. If the laser beam can be scanned across the path of the main journal 1001 all along its extension in the X axis direction, there may be no need to displace the laser source 1 in the X axis direction during heat treatment of one of, for example, the main journals 1001 of a crankshaft, but only when switching from treatment of one journal to treatment of another one; the same applies to the heat treatment of, for example, the rod journals 1002 of a crankshaft.

However, during heat treatment of a rod journal 1002, the central axis of which is radially displaced from the central axis of the main journals, during rotation of the respective crankshaft work piece 1000 in the work piece carriage 20, the laser light source 1 is moved vertically in parallel with the Z axis and the workpiece carriage 2 is moved horizontally in parallel with the Y axis, so as to keep a constant distance between the laser source (such as the output of the scanning means of the laser source, or the surface of a lens) and the surface onto which the laser beam is projected. In other embodiments of the disclosure, the crankshafts can be moved in parallel with the Z and Y axes. Also, or alternatively, the laser source can be arranged to be moveable in parallel with the Z and Y axes.

The operation of the first 12 and second 13 laser carriage drive means, as well as the operation of the workpiece carriage drive means 21 and of the drive means for rotating the workpieces 1000 in the workpiece carriages 20, can be controlled by electronic control means such as a computer, computer system or PLC (not shown in FIG. 2).

The laser source 1 includes a scanning system arranged for modifying the direction of the laser beam. Such scanning systems are well known in the art, and frequently include one or more scanning mirrors, the angles of which can be modified in accordance with scanning functions, such as sine functions, triangular functions, etc., under the control of a computer. A one-axis scanning system (for example, a scanning system with a scanning mirror pivotable about one axis, or similar) can be used to scan the laser beam in parallel with the X axis, that is, perpendicularly to the direction of movement of the surface of the workpiece 1000 relative to the laser source 1 due to the rotation of the workpiece 1000. A rapid scanning across the relevant portion of the surface can thus create a virtual spot having an extension in the X direction much larger than the extension of the spot without scanning: thus, the original spot is turned into a wider virtual spot (with a larger extension in the X direction), but with a smaller power density, as the power of the beam is distributed over a larger area.

With a two-axes scanning system (for example, with a scanning system having a bi-axial mirror, or two uni-axial mirrors), the laser beam can be moved in two directions, for example, on the one hand in parallel with the X axis, and on the other hand in parallel with the Y axis, and combinations thereof. Thus, apart from scanning the surface perpendicularly to the direction of movement of the surface relative to the laser source, that is, apart from scanning the surface "along" the surface of the journals in the X axis direction, the laser beam can also scan the surface in the direction of its movement, that is, in parallel with the Y axis; thereby, the surface of a journal of a crankshaft can be scanned also in the circumferential direction of the journal. Also, the laser beam can describe paths that combine movement in the X direction and the Y direction. Thereby, the beam can follow paths having complex shapes, such as rectangles, ovals, trapezoids, etc. The laser spot can be scanned over the surface to form a virtual filled rectangle having a substantial height in the Y (or W) direction (for example, by following a meander pattern within a rectangular boundary or by following a plurality of separated lines within said boundary), or to repetitively outline the edges of a rectangle, or any other geometric shape. Thus, using the capacity of the scanning system, a virtual or equivalent effective laser spot can be created, having a desired extension and shape, both in the X direction and in the Y or W direction. In the case of a so-called XYZ-scanner, in addition to the possibility of movement in the X and Y directions, a focusing lens is provided which can be displaced in the Z direction by some kind of drive means, thereby allowing for dynamic adaptation of the size of the laser spot. Thereby, both the position of the spot and its size can be controlled and adapted to optimize the hardening process. Also, as an alternative or in addition to the displacement of a focusing lens or similar, the size of the laser spot can be controlled and adapted by moving the laser source in parallel with the Z-axis, using the first laser carriage drive means. Also, the system can include means for varying the distribution of the power within the laser spot, as known from, for example, DE-3905551-A1 mentioned above.

Figure 3:
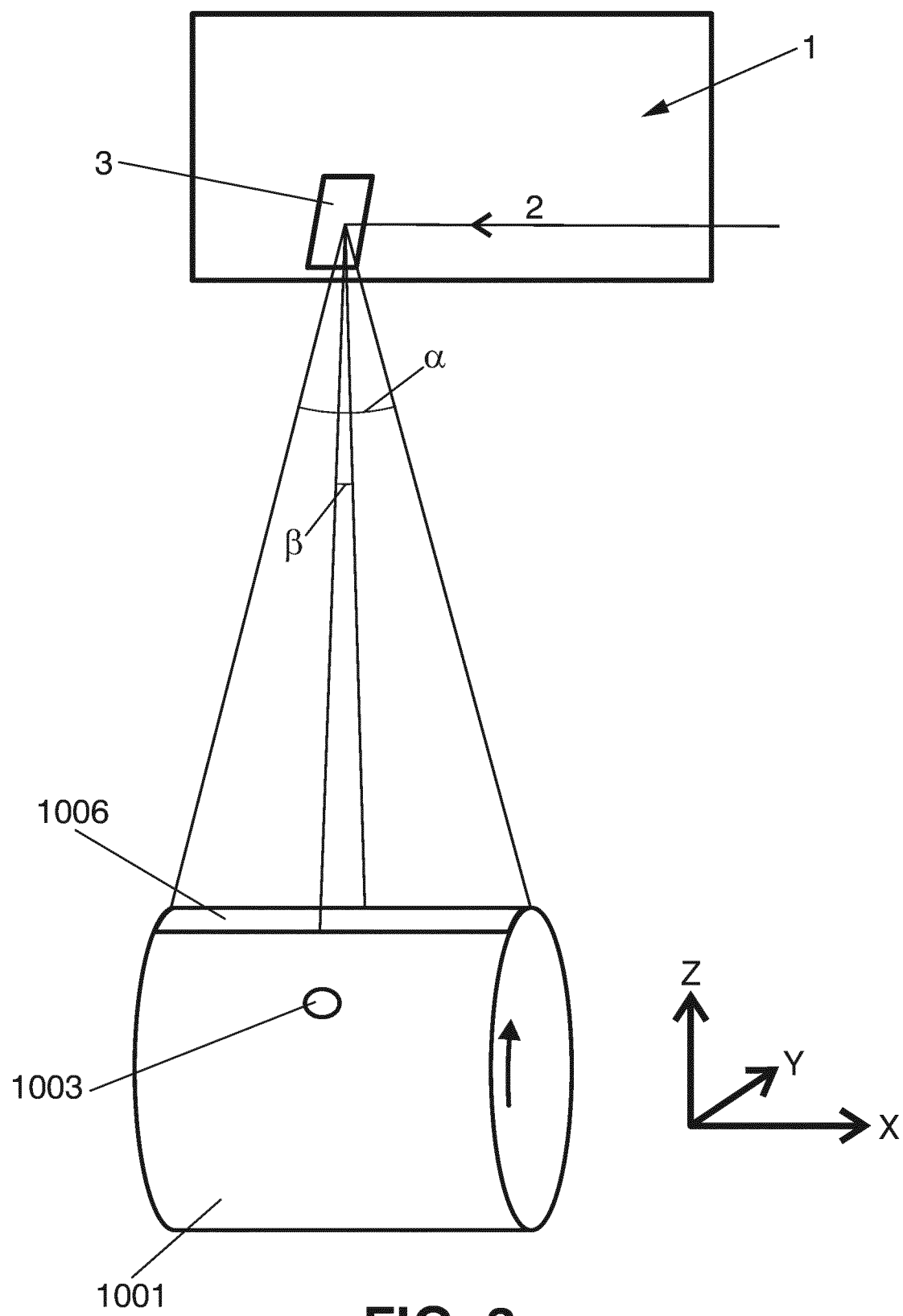
FIG. 3 is a schematic front elevation view of a portion of the laser source 1 and a portion of a workpiece, in accordance with one possible embodiment of the disclosure.

FIG. 3 schematically illustrates the laser source 1 including a schematically illustrated two-axes scanning system 3, based on a bi-axial mirror or two uni-axial mirrors and arranged to deflect an incoming laser beam 2 in the vertical plane parallel with the X axis and in the vertical plane parallel with the Y axis; the angle α represents the maximum sweep in the vertical plane parallel with the X axis, and the angle β represents the maximum sweep in the plane parallel with the Y axis. FIG. 3 schematically illustrates the laser source 1 placed above a workpiece and, more specifically, above the main journal 1001 of a crankshaft, which includes an oil lubrication hole 1003 and which is rotated in the workpiece carriage (not shown) in the direction suggested by the arrow. Schematically illustrated in FIG. 3 is a portion or section 1006 that can be swept by the laser spot due to the scanning of the laser beam. Thus, using this kind of laser source, a small laser spot projected onto the top of the workpiece can be replaced by a larger virtual or equivalent spot, obtained by repetitively scanning, at high speed, a pattern having any desired shape, within the section 1006 which is determined by the maximum sweep allowed by the scanning system, in accordance with angles α and β. Thus, instead of heating one single small spot with the laser beam, a larger area can be heated (but with less power per unit of area) during a time interval by scanning said area with the laser beam. Or, with other words: instead of providing a large spot (such as a large rectangular spot) by using, for example, appropriate fixed optics, a corresponding power distribution can be achieved by scanning a smaller and more power intensive spot over a larger area. This involves one important advantage: it provides for the possibility of dynamically applying different amounts of energy to different portions of the surface, by adapting the scanning pattern, the velocity of the scanning movement, the power of the beam, and/or the size of the spot, in accordance with different characteristics of different portions of the surface, for example, depending on the sensitivity to heat and the risk for damage by overheating. For example, scanning pattern, scanning velocity, beam power and/or laser spot size can be chosen (and dynamically adapted during the hardening process) so as to limit the amount of heating energy applied to the surface in the vicinity of the oil lubrication holes or in the vicinity of undercut fillets. To obtain an adequate hardening depth and quality, scanning is performed repetitively and preferably with a high frequency, such as more than 10 Hz or, more preferably, more than 50, 100, 150, 200 or 250 Hz, so as to avoid substantial fluctuations in temperature within the heated area.

Figure 4C:
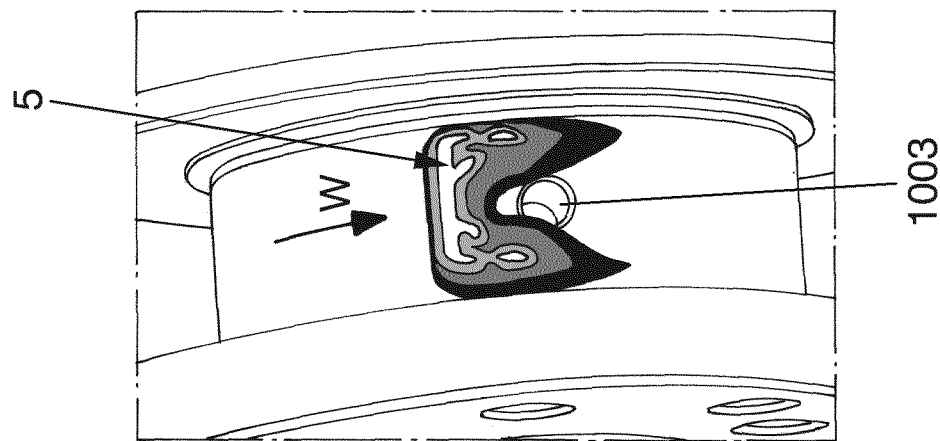
FIGS. 4A-4C schematically illustrate how the energy distribution of an effective laser spot is adapted when hardening the area around an oil lubrication hole of a crankshaft.
Figure 4B:
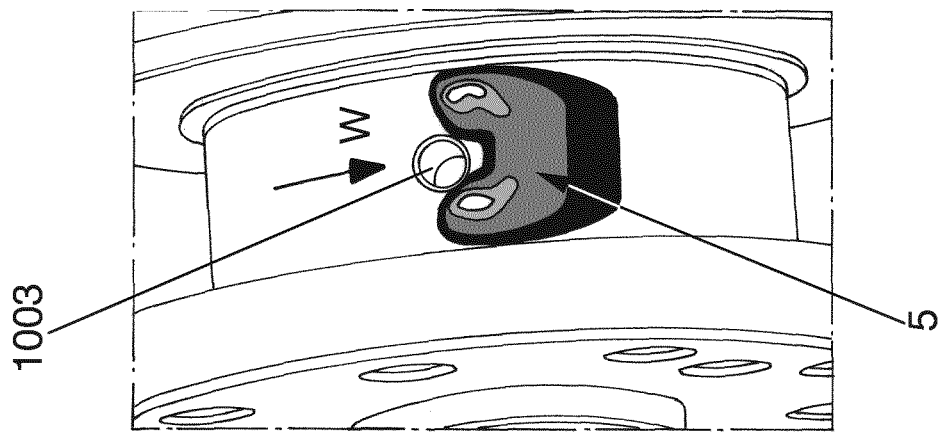
Figure 4A:
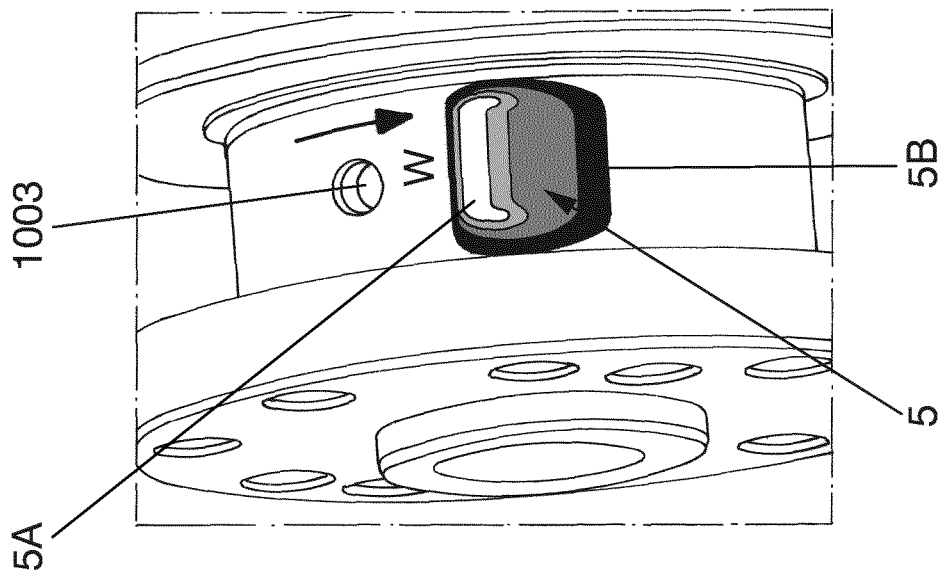

FIGS. 4A-4C show how the energy distribution of an effective laser spot can be adapted to accommodate for an oil lubrication hole. The oil lubrication hole 1003 is positioned in a surface of a journal of a crankshaft, and said surface extends in a first direction W, namely, the circumferential direction, and in a second direction parallel with the axis of rotation of the crankshaft. In FIG. 4A, a substantially rectangular equivalent effective laser spot 5 is used, having a leading portion 5A with higher power density and a trailing portion 5B with lower power density. However, as shown in FIG. 4B, when the oil lubrication hole 1003 approaches the effective laser spot due to the relative movement between the surface of the crankshaft and the laser source due to, for example, rotation of the crankshaft around its longitudinal axis, the energy distribution is substantially adapted by reducing the power or energy density towards the center of the leading portion 5A, so as to avoid overheating of the area adjacent to the oil lubrication hole 1003. Here, the effective laser spot is substantially U-shaped. Subsequently, once the oil lubrication hole 1003 has passed the leading portion 5A, the original energy distribution at the leading portion is restored, whereas the energy distribution at the trailing portion 5B is adapted to accommodate for the oil lubrication hole 1003, by reducing the energy or power density towards the center of the trailing portion. Here, the effective laser spot 5 substantially adopts an inverted-U-shape, as shown in FIG. 4C. That is, while the oil lubrication hole is passing through the effective laser spot, the energy distribution is adapted so as to apply less energy to the more heat sensitive area adjacent to the oil lubrication hole, than what is applied to the surface to be hardened away from said oil lubrication hole. The area around the oil lubrication hole can be hardened without harming the more heat sensitive subarea adjacent to the oil lubrication hole; the lateral portions of the U-shaped effective laser spot serve to harden the areas at the sides of the oil lubrication hole. The change in energy distribution illustrated in FIGS. 4A-4C can, for example, be obtained by adapting the scanning pattern, and/or by adapting the way in which the beam power is distributed along the scanning pattern (for example, by adapting the way in which the laser beam is switched on and off during different segments of the scanning pattern), and/or by adapting the scanning speed in correspondence with different segments of the scanning pattern, etc.

Figure 5A:
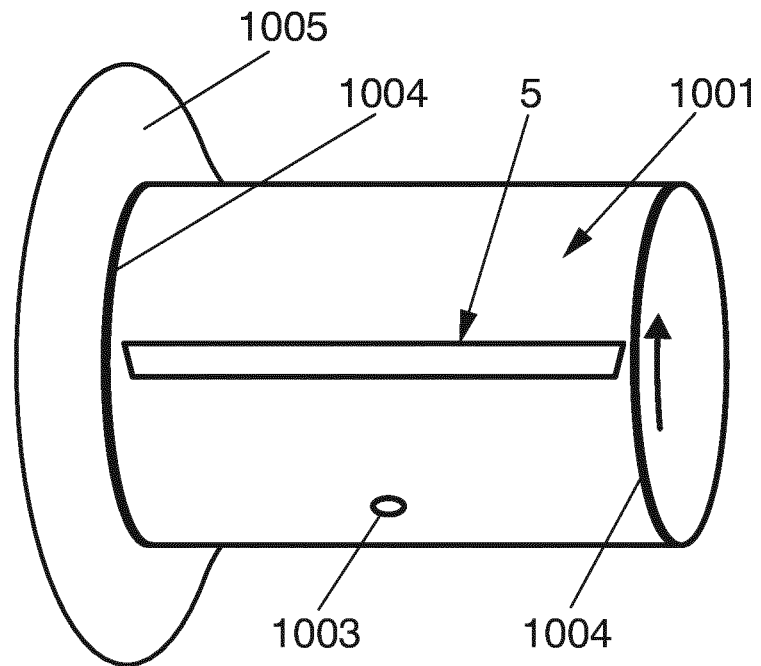
FIGS. 5A and 5B are schematic top views of a section of a workpiece at two different moments of the hardening process, with an effective laser spot created by using a polygonal scanning pattern.
Figure 5B:
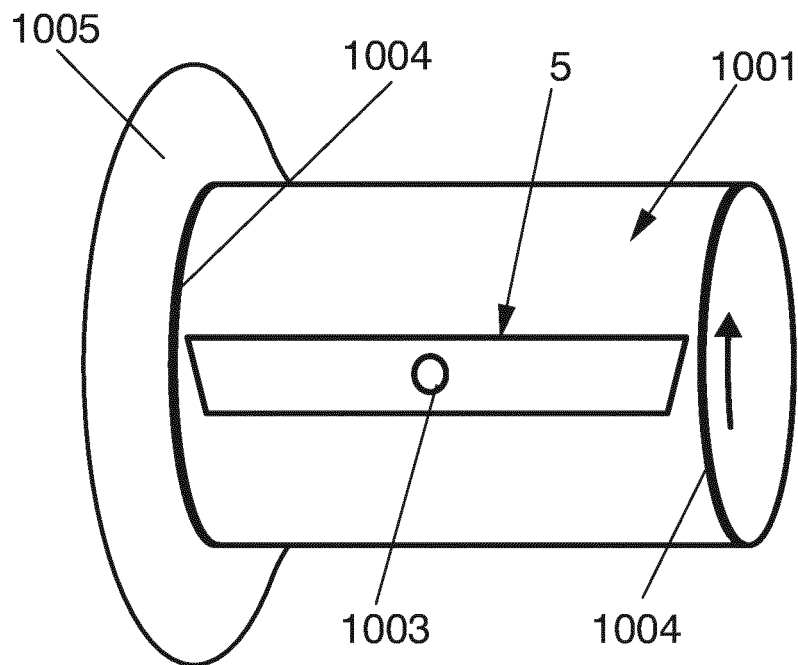

A simple scanning pattern could comprise a simple pattern or a polygon, such as schematically illustrated in FIGS. 5A and 5B, which are top views of a portion of a crankshaft, namely, of a main journal 1001 of the crankshaft, during two different stages of a hardening process. In FIGS. 5A and 5B, the scanning pattern extends almost over the entire width of the journal, substantially from one of the fillets 1004 to the other one. The scanning pattern is designed to imply a lower power density in the more heat sensitive subarea around the oil lubrication hole 1003 (cf. FIG. 5B), than in the less heat sensitive subarea or region further away from the oil lubrication hole (cf. FIG. 5A); in this case, this is achieved by a larger height of the trapezoidal scanning pattern when the area around the oil lubrication hole 1003 is being scanned. Also the area adjacent to the fillets 1004 is considered to be a heat sensitive area, for example, due to the use of undercut fillets. Thus, the scanning pattern is arranged to provide for a lower power density also in that area; this is achieved by using a trapezoidal scanning pattern, whereby, with a substantially constant scanning speed, less energy will be received in the vicinity of the fillets, than if a rectangular scanning pattern is used. Instead of using a trapezoidal pattern, only two parallel lines can be used, such as the top and bottom lines of the trapezoid shown in FIGS. 5A and 5B.

Now, irrespective of whether only two parallel lines are used, or whether these two lines are interconnected to form a polygon such as illustrated in FIGS. 5A and 5B, a problem with this approach is that the size of the actual laser spot limits the height of the polygon, that is, in a case such as the one in FIGS. 5A and 5B, the height of the polygon in the circumferential direction, or the distance between the two parallel lines in the circumferential direction. It is important that the temperature to which the material is heated within the effective laser spot be substantially constant during a substantial part of the heating, to avoid fluctuations that could negatively affect the quality of the hardening process. Thus, the height of the polygon is to a substantial extent limited by the diameter of the actual laser spot. However, it is often desired that the effective laser spot have a substantial extent in the direction of travelling, that is, in the case illustrated in FIGS. 5A and 5B, in the circumferential direction: this is so because in order to assure a sufficient hardening depth, each point of the surface to be hardened should remain for a sufficiently long time within the area being heated by the effective laser spot. On the other hand, in order to achieve a high productivity in terms of units per hour, the effective laser spot should travel as rapidly as possible. Thus, a substantial extension of the effective laser spot in the direction of travelling is desired.

Figure 6:
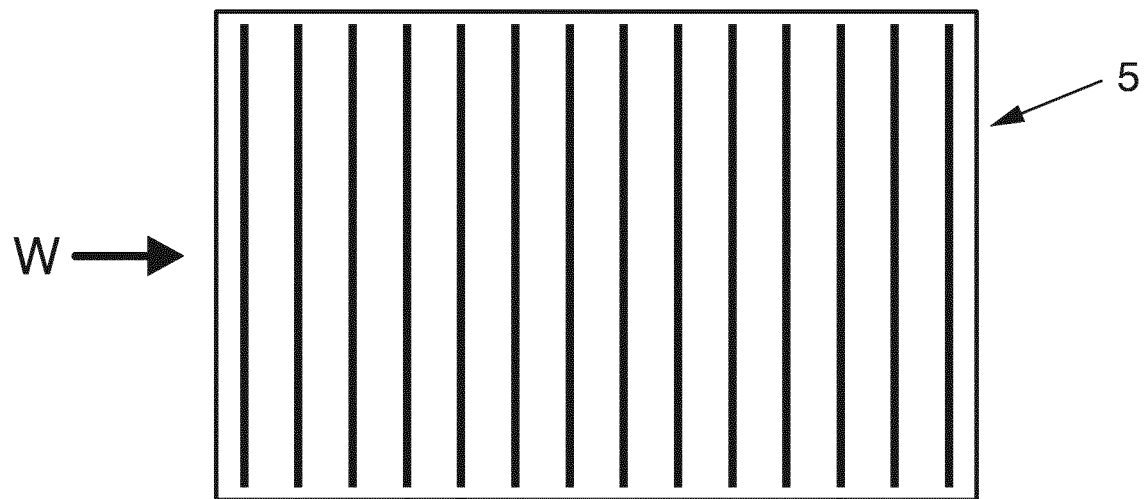
FIG. 6 schematically illustrates an effective laser spot created by a scanning pattern comprising a plurality of parallel lines.

For a given size of the actual laser spot, a substantial extension of the effective laser spot in the direction of travelling can be achieved by providing a scanning pattern comprising more than two lines arranged after each other in the direction of travelling, such as schematically illustrated in FIG. 6, wherein the effective laser spot 5 is created by a plurality of parallel lines, extending in the second direction perpendicular to the first direction W, that is, the direction of the relative movement between the effective laser spot and the surface area being hardened.

Such a scanning pattern can be created by repetitively scanning the actual laser spot in the second direction perpendicular to the first direction in which the effective laser spot is travelling, displacing the laser beam a small distance in the first direction between each scanning step, so as to trace a plurality of parallel lines. Once the actual laser spot has completed the scanning pattern, it will return to its original position and carry out the scanning pattern once again. The frequency with which this occurs is preferably high, so as to avoid undesired temperature fluctuations within the effective laser spot 5.

The laser beam can be switched off while it is being displaced towards a new line to be followed, and/or between finishing the last line of the scanning pattern and returning to the first line of the scanning pattern. However, switching laser beams on and off requires time, and can slow down the scanning frequency. Also, the time during which the laser beam is switched off is time that is lost in terms of efficient use of the laser for heating.

Figure 7A:
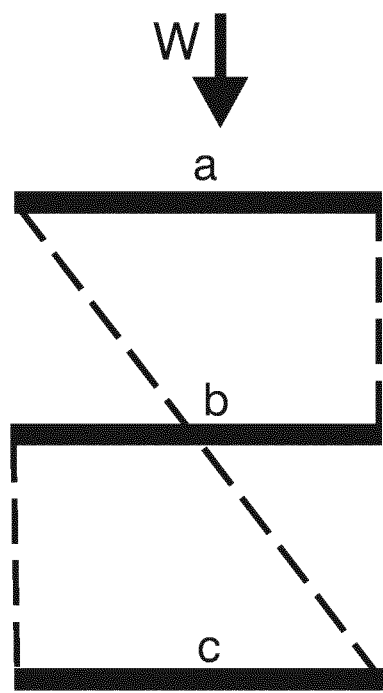
FIGS. 7A and 7B illustrate one possible scanning pattern comprising a plurality of parallel lines.
Figure 7B:
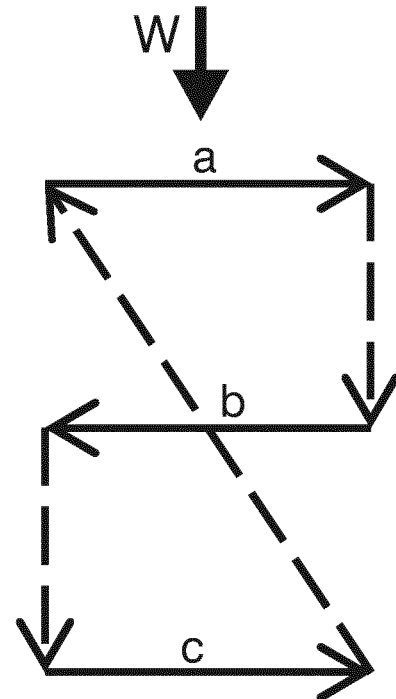

FIGS. 7A and 7B illustrates one possible scanning pattern comprising three main lines a-c (illustrated as continuous lines) of the scanning pattern, and hatched lines illustrating the path which the laser spot follows between said lines. In FIG. 7B, the arrows schematically illustrate the way in which the actual laser spot travels over the surface to be hardened while following the scanning pattern.

Now, this scanning pattern involves a problem in that the heat distribution will not be symmetric. The same applies if, at the end of the pattern, when finishing the last line c (that is, from the head of the arrow of line c in FIG. 7B), the laser beam returns vertically to line a.

Figure 8A:
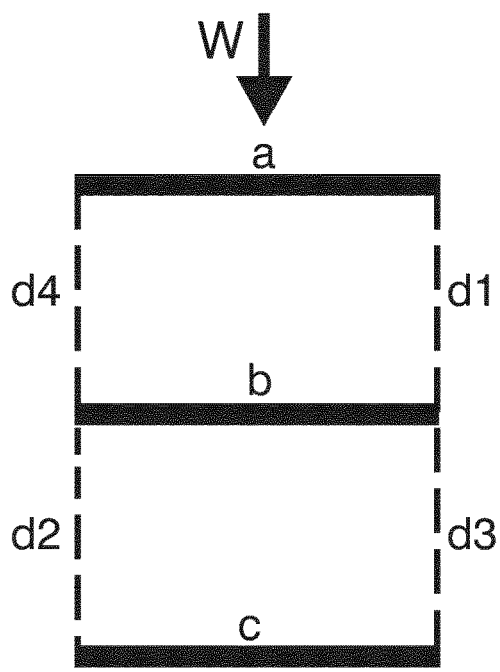
FIGS. 8A and 8B illustrate a scanning pattern for creating an effective laser spot in accordance with an embodiment of the disclosure.
Figure 8B:
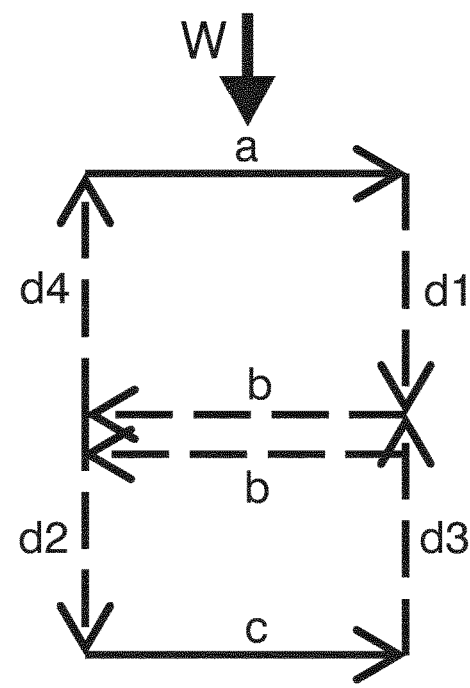

A more symmetrical energy distribution with regard to the W axis can be obtained with a scanning pattern as per the one of FIGS. 8A and 8B, likewise comprising three parallel lines a-c interconnected by the lines d followed by the actual laser spot when moving between these lines. As illustrated in FIG. 7B, the laser beam, from the beginning of the first line a, travels as follows: a-d1-b-d2-c-d3-b-d4.

That is, the actual laser spot travels along the intermediate line b twice as often as it travels through the first line and the last line: it travels along the intermediate line b twice for each time it travels along the first line a and the last line c. Thereby, a completely symmetrical scanning pattern can be obtained, in relation to the W axis, that is, in relation to the circumferential direction.

The energy distribution along the W axis can be set by adjusting, for example, the distance between the lines a-c and the speed with which the laser beam travels along the lines. By adjusting the speed and/or scanning pattern, the energy distribution can be dynamically adapted without turning the laser beam on and off or without substantially modifying the power of the laser beam. For example, if the energy is to be distributed substantially equally throughout the effective laser spot, the laser beam can travel with a higher speed along the intermediate line b than along the first line a and the last line c. For example, the velocity of the actual laser spot along line b can be twice the speed of the actual laser spot along lines a and c. In some embodiments of the disclosure, the velocity of the effective laser spot along lines d1-d4 can also be substantially higher than the velocity of the effective laser spot along lines a and c.

Thus, tailoring of the energy distribution can be achieved by adapting the distribution of the lines, such as the first, last and intermediate lines a-c, and by adapting the velocity of the laser spot along the different segments a-d (including d1-d4) of the scanning pattern. The distribution of the segments and the velocity of the segments can be dynamically modified while the effective laser spot is travelling along the surface area to be hardened, such as around a journal of a crankshaft, so as to adapt the energy distribution to avoid overheating of more heat sensitive subareas, such as subareas adjacent to oil lubrication holes, undercut fillets, or a previously hardened area that the effective laser spot approaches at the end of its travelling around the circumference of a surface area to be hardened, such as the surface of a journal of a crankshaft. Also, the scanning pattern can be adapted by adding or deleting segments during the travelling of the effective laser spot along the surface are to be hardened.

Figure 9A:
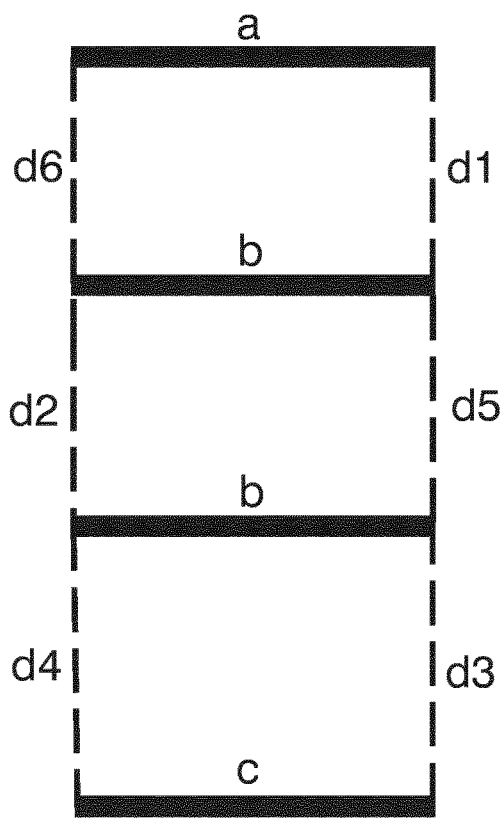
FIGS. 9A and 9B illustrate a scanning pattern for creating an effective laser spot in accordance with another embodiment of the disclosure.
Figure 9B:
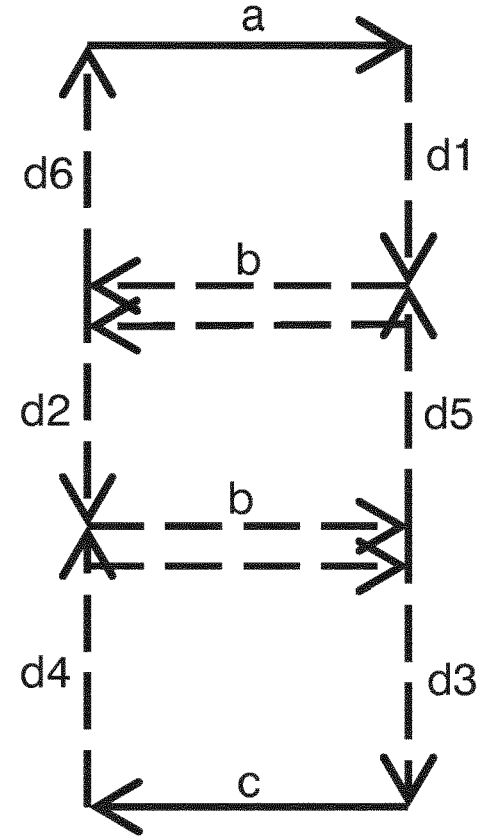

The same principle can be applied to other scanning patterns, such as the scanning pattern of FIGS. 9A and 9B, which includes an additional intermediate line b. Here, the path followed by the actual laser spots: a-d1-b-d2-b-d3-c-d4-b-d5-b-d6.

Figure 10C:
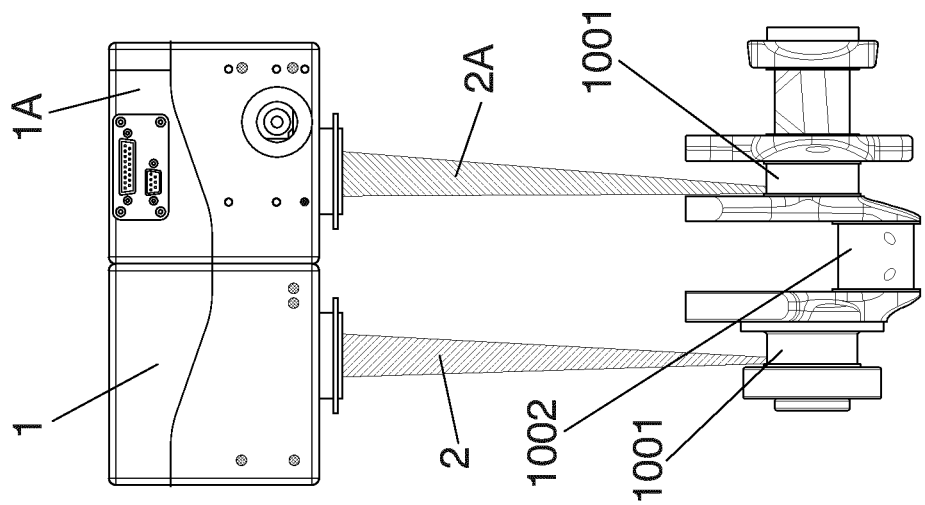
FIGS. 10A-10C schematically illustrate how two laser sources can be used to harden journals of a crankshaft.
Figure 10B:
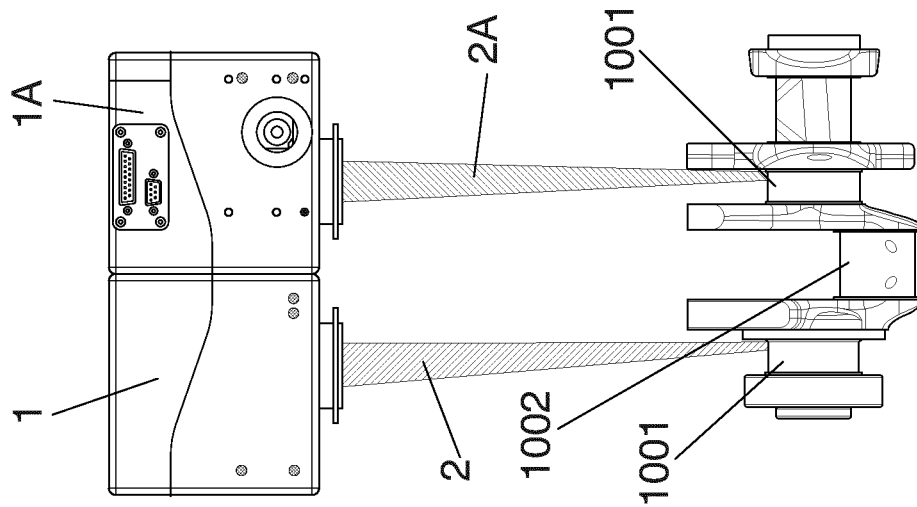
Figure 10A:
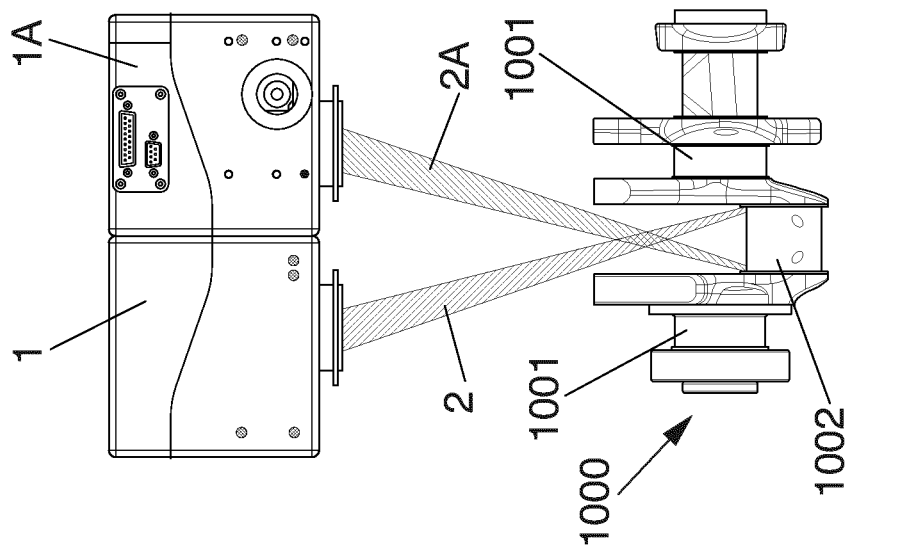
Figure 11A:
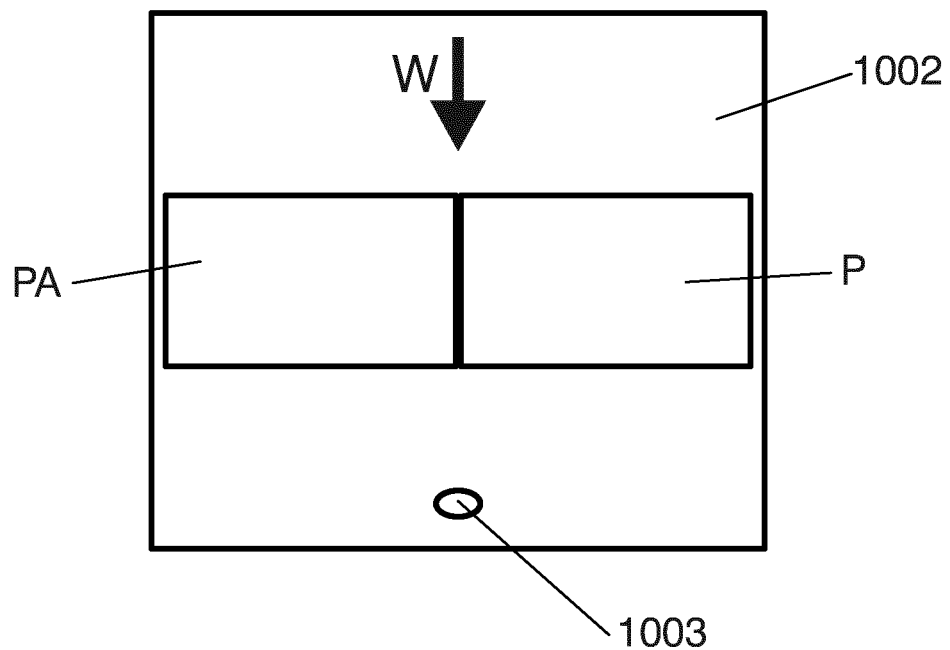
FIGS. 11A and 11B schematically illustrate how laser beams from two laser sources can provide an effective laser spot on the surface of a journal of a crankshaft.
Figure 11B:
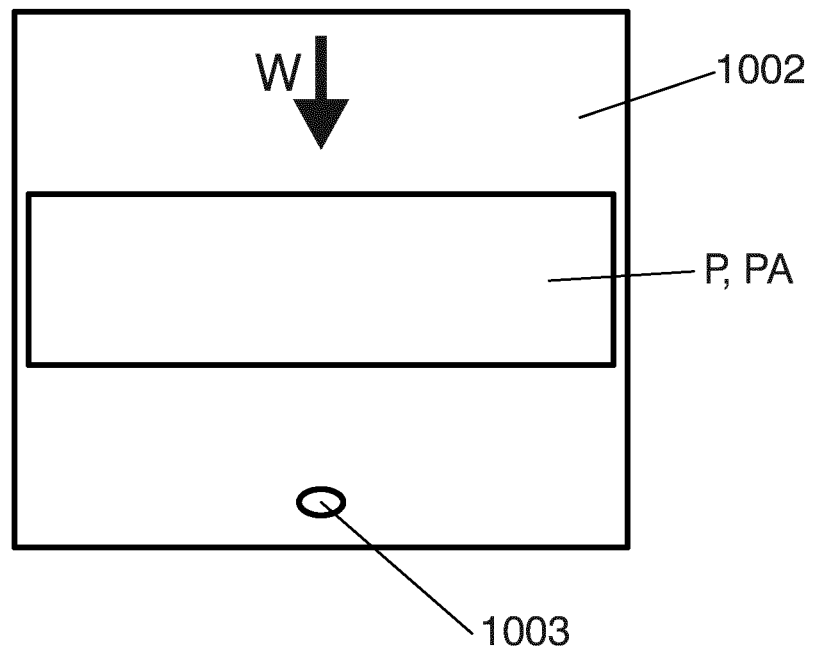

FIGS. 10A-10C schematically illustrate how two lasers or laser sources 1 and 1A can be used for hardening the surfaces or journals of the crankshaft, which can be advantageous, for example, when the crankshaft has journals having different widths. The crankshaft 1000 of FIGS. 10A-10C includes main journals 1001 having a first width, and rod journals 1002 having a second width which is, for example, about twice the first width. In FIG. 10A, the laser beams 2 and 2A from the laser sources 1 and 1A, respectively, are both applied to the rod journal, so that the combined power and scanning capacity of these laser sources can be used to provide, on the surface area to be hardened, a combined effective laser spot adequate for efficient and rapid hardening of the rod journal. In another stage of the hardening process, two main journals are being hardened simultaneously, each of them by one single laser source, as illustrated in FIGS. 10B and 10C. FIGS. 11A and 11B shows how the portions P and PA heated by the first laser beam 2 and the second laser beam 2A, respectively, can be more or less overlapping. Substantially overlapping portions can be preferred to optimize uniformity of the hardening and avoid any risk for border effects where the two portions meet. However, as suggested by FIG. 10A, it can sometimes be of interest to let each of the laser beams harden only one part of the area to be hardened, in what regards the extension of said area in the second direction, that is, along the axis of the crankshaft. This can sometimes be helpful in order to be able to subsequently harden several journals of the crankshaft, without displacing laser source or crankshaft in said second direction, while overcoming the problem that counterweights and other radially protruding parts of the crankshaft may interfere with the laser beam. This is easily understood when viewing FIGS. 10A-10C: in FIG. 10A, the first laser beam 2 is applied to a portion P and the second laser beam 2A is applied to a portion PA of the rod journal 1002, placed substantially side by side and not substantially overlapping with each other, in accordance with FIG. 11A. In FIGS. 10B and 10C, the laser beams have been reoriented to impinge on the two main journals 1001, without displacing the laser sources or the crankshaft in parallel with the axis of rotation of the crankshaft.

Figure 12A:
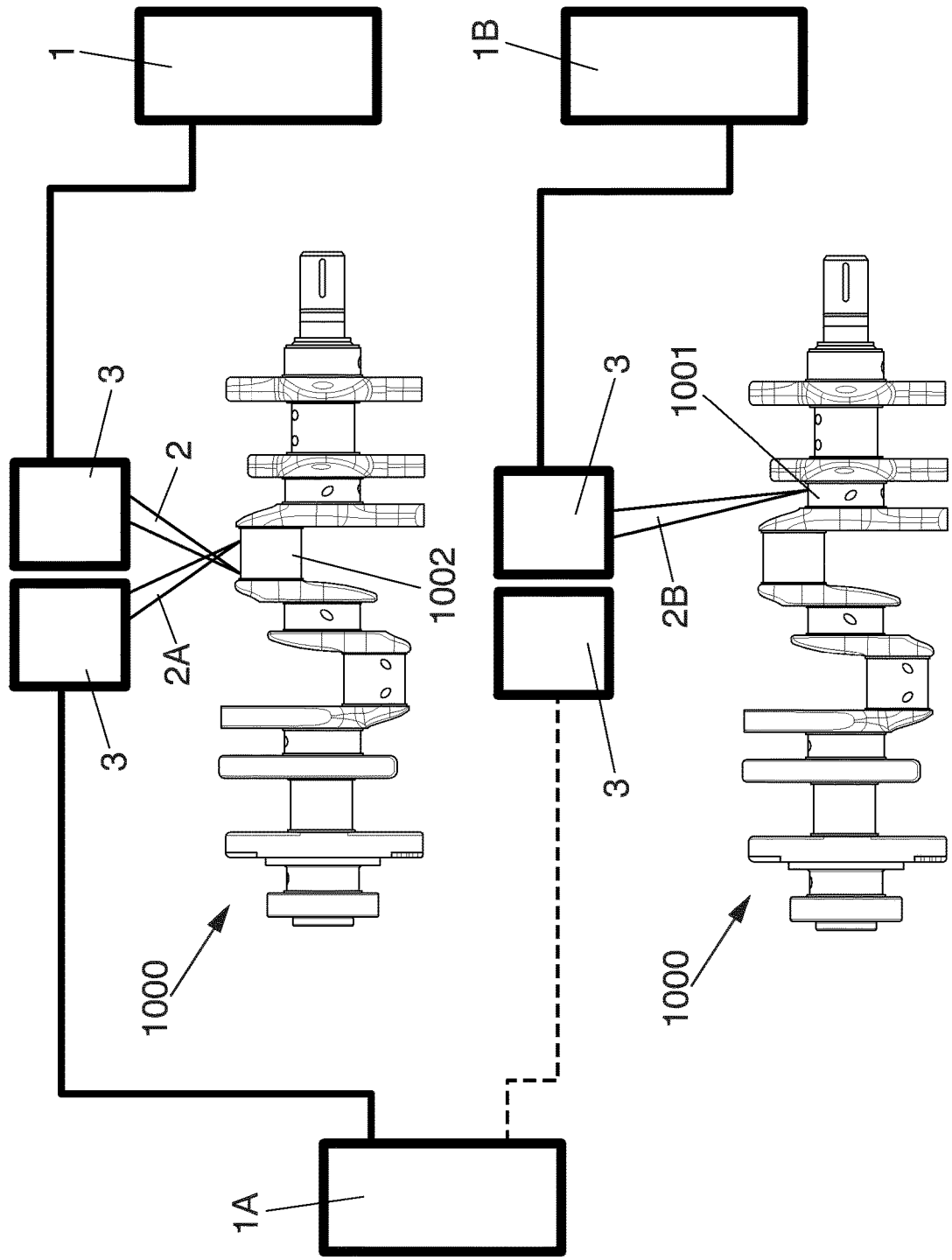

In some embodiments of the disclosure, two or more laser sources can be shared between two or more crankshafts, thereby enhancing flexibility and efficient use of the laser sources and available laser power. For example, FIGS. 12A and 12B illustrate one possible arrangement, in which the machine or system is arranged to harden, simultaneously, two or more crankshafts. In the illustrated arrangement, the machine comprises three laser sources 1, 1A and 1B, associated with respective scanning means 3. During at least one stage (FIG. 12A) of the hardening process, laser beams 2, 2A from two (1, 1A) of these three laser sources are used for hardening a first one of the crankshafts (FIG. 12A illustrates how these laser sources 1, 1A, are used to together harden a rod journal 1002 of the crankshaft) and a laser beam 2B from one of said laser sources 1B is used for hardening another one of said crankshafts (FIG. 12A illustrates how laser beam 2B is used to harden a main journal 1001), whereas during at least another stage of the hardening process (FIG. 12B), a laser beam 2 from one of these three laser sources 1 is used for hardening the first one of the crankshafts (namely, in FIG. 12B, a main journal 1001 thereof) and laser beams 2A, 2B from two of said laser sources 1A, 1B are used for hardening another one of said crankshafts (at the stage illustrated in FIG. 12B, a rod journal thereof). That is, sharing of one or more laser sources between a plurality of crankshafts can be used to optimize the use of the equipment and reduce the idle time of expensive laser equipment, enhancing efficiency and productivity, In the present document, the term "effective laser spot" refers to an area onto which a laser beam is effectively projected so as to illuminate and heat the area. The effective laser spot can be a laser spot obtained by transforming an original laser beam using optics so as to shape the laser spot and so as to distribute the power over the effective laser spot in a desired manner, or a virtual or equivalent laser spot obtained by rapidly and repetitively scanning the laser beam following a scanning pattern so as to repetitively apply the laser beam to the same area or to substantially the same area, so that the heating effect of the laser beam is substantially the same as it would have been if a stationary laser beam had been used having a power distribution corresponding to the power distribution across the virtual or equivalent laser spot during one scanning cycle. Here, the term "rapidly" means that the scanning speed is much larger than the speed of the relative movement between laser source and the surface of the crankshaft, for example, in the circumferential direction, so that portions of the surface area to be hardened are repetitively heated by the laser spot. For example, typically, the scanning speed can be selected so that, for example, at least 10, 50 or 100 scanning cycles per second are achieved. Preferably, when the effective laser spot is a virtual or equivalent laser spot obtained by repetitive scanning an actual or real laser spot over the surface area to be hardened, this scanning preferably takes place in two dimensions, and the size of the virtual laser spot in any of said dimensions is preferably at least 2, 3, 4, 5, 10, 20 or more times the size of the actual or real laser spot in said dimension, for example, in the direction parallel with an axis of rotation of a crankshaft and in the circumferential direction of a journal of the crankshaft. For example, it can be preferred that during at least 50% of the time of application of the effective laser spot onto the surface area, the effective laser spot has a width in the circumferential direction of at least 5 mm, preferably at least 7 mm, more preferably at least 10 mm, and even more preferably at least 15 mm, 20 mm, 30 mm or more, such as at least 50 mm. Such a substantial extension can provide for high productivity combined with a sufficient hardening depth.

The term scanning is preferably intended to imply movement of the laser beam, and the scanning pattern is preferably intended to refer to the pattern that the beam would follow on a stationary surface, that is, without taking into account the relative movement between the laser source and the surface of the workpiece.

Generally, the growth of the treated area or segment is achieved by a relative movement between the effective laser spot and the surface to be hardened, by moving the effective laser spot and said surface in relation to each other, for example, in the case of a crankshaft, by rotating the crankshaft. In order to achieve a sufficient hardening depth, for example, a case hardening depth of 1000 μm or more, it is preferred that substantially each portion of the surface area to be hardened remain within the area of the effective laser spot for a sufficient amount of time, such as typically, for example in the case of crankshaft journals, 0.5-5 seconds, such as 1-3 seconds, so that not only the surface temperature will be high enough, but so that the workpiece is heated sufficiently up to the required depth. Increasing the power density of the laser beam is not a substitute for sufficient heating time, as the surface area should not be overheated, as this could cause damage to the workpiece. Thus, the surface temperature should be within an adequate range for a sufficient time. Therefore, a substantial size of the effective laser spot is desired, in one dimension so as to provide for a sufficient width of the hardening track (for example, so as to cover substantially the entire width of a journal of a crankshaft), and in another dimension so as to allow for a high relative speed between the effective laser spot and the surface to be treated (thus providing for a high production rate), while allowing the portions to be hardened to remain for sufficient time within the effective laser spot so as to achieve the desired or required hardening depth.

In the present document, the term "crankshaft" preferably refers to the part of an engine that translates reciprocating linear piston motion into rotation, for example, to the kind of crankshaft that is used in internal combustion engines, such as those used in many types of motor vehicles, such as trucks, automobiles and motorcycles.

In the present document, hardening depth preferably refers to the effective case depth, which preferably refers to the distance perpendicularly from the surface of the hardened case to the furthest point where a specified level of hardness is maintained. Said level can be in the range of, for example, 40-55 HRC, preferably 45 HRC. In the field of crankshafts, desired levels of hardness are generally decided taking into account the carbon content of the steel, but a typical level is 45 HRC. In the context of the present document and in what regards the hardening of journals of a crankshaft, a hardening depth of at least 1000, 2000 or 3000 μm is preferred.

Another aspect of interest can be the level or depth until which 100% transformed martensite can be observed. In the context of the present document and in what regards the hardening of journals of a crankshaft, this depth can preferably be at least 200, 300, 500, 800, 1000 μm or more.

When a segmented scanning pattern is used, a scanning speed of at least 300 segments per second can be preferred, whereas speeds of, for example, at least 600, 1000, 5000 and 10000 segments per second can be more preferred, preferably in combination with scanning pattern repetition frequencies of at least 10 Hz, more preferably at least 50 Hz, even more preferably at least 100 Hz or 200 Hz.

While the present disclosure has been described with several references to the surface hardening of crankshafts, the scope of the disclosure is by no means limited to the surface treatment of crankshafts.

The disclosure is obviously not limited to the specific embodiment(s) described herein, but also encompasses any

The invention claimed is:

1. A method of laser hardening of a surface of a workpiece, the workpiece comprising at least one surface area to be hardened, the method including the steps of:
projecting a laser beam from a laser source onto said surface area, so as to produce a laser spot on said surface area;
generating a relative movement between the surface of the workpiece and the laser source, thereby allowing the laser spot to be subsequently projected onto different portions of said surface area; and
during the relative movement, repetitively scanning the laser beam across the respective portion of said surface area in two dimensions, following a scanning pattern so as to produce a two-dimensional effective laser spot on said surface area, said effective laser spot having an energy distribution,
wherein due to the relative movement, said effective laser spot travels along said surface area;
wherein said scanning pattern comprises at least three segments, and wherein said scanning of the laser beam is carried out so that said laser beam follows at least one of said segments more frequently than said laser beam follows at least another one of said segments.

2. The method according to claim 1, wherein the scanning pattern comprises at least three substantially parallel lines distributed one after the other in a first direction, said lines extending in a second direction,
wherein said at least three lines comprise a first line, at least one intermediate line, and a last line arranged one after the other in said first direction, and
wherein said scanning of the laser beam is carried out so that said laser beam or the laser spot follows said intermediate line more frequently than said laser beam follows said first line and/or said last line.

3. The method according to claim 2, wherein said scanning pattern comprises a plurality of said intermediate lines.

4. The method according to claim 2, wherein the laser spot is displaced with a velocity that is higher along said at least one intermediate line than along said first line and said last line.

5. The method according to claim 2, wherein the scanning pattern further comprises lines extending in said first direction, between the ends of the first line, the intermediate line, and the last line, whereby the laser spot follows said lines extending in said first direction when moving between said first line, said intermediate lines and said last line.

6. The method according to claim 5, wherein the laser spot is displaced with a velocity that is higher along said lines extending in the first direction, than along said first line and said last line.

7. The method according to claim 1, wherein the scanning pattern comprises at least three substantially parallel lines distributed one after the other in a first direction, said lines extending in a second direction,
wherein said at least three lines comprise a first line, at least one intermediate line, and a last line arranged after the other in said first direction,
and wherein the scanning of the laser beam is carried out such that the laser spot is scanned along said lines according to a sequence in accordance with which the laser spot, after following said first line, follows said intermediate line, said last line, said intermediate line, and said first line, in that order.

8. The method according to claim 1, wherein the laser spot is displaced along said scanning pattern while maintaining the power of the laser beam substantially constant.

9. The method according to claim 1, wherein said workpiece is a crankshaft.

10. The method according to claim 1, wherein said surface area comprises at least one more heat sensitive subarea and at least one less heat sensitive subarea, and wherein said energy distribution is adapted so that said energy distribution is different in a more heat sensitive subarea than in a less heat sensitive subarea, so as to prevent overheating of said more heat sensitive subarea.

11. A method of laser hardening of surfaces of journals of a crankshaft, said crankshaft having at least a first journal having a first width and at least a second journal having a second width, said second width being larger than said first width, each of said journals comprising a surface area to be hardened, said surface area extending in a first direction corresponding to a circumferential direction of the journal, and in a second direction parallel with an axis of rotation of the crankshaft, the method comprising:
A) during at least one stage of the method, simultaneously projecting a laser beam from a first laser source and a laser beam from a second laser source onto said surface area of said second journal; and
B) during at least another stage of the method, projecting a laser beam from said first laser source onto said surface area of said first journal, while simultaneously projecting a laser beam from said second laser source onto another portion of a crankshaft,
wherein during at least one stage of the method, the laser beam from the first laser source is projected onto a journal of one crankshaft, and the laser beam from the second laser source is projected onto a journal of another crankshaft.

12. The method according to claim 11, comprising:
A) during at least one stage of the method:
projecting a first laser beam from a first laser source onto said surface area of said second journal, so as to produce a first effective laser spot on said surface area, said effective laser spot extending, in said second direction, across a first portion of the surface area to be hardened, and
projecting a second laser beam from a second laser source onto said surface area of said second journal, so as to produce a second effective laser spot on said surface area, said effective laser spot extending, in said second direction, across a second portion of the surface area to be hardened,
wherein said first portion and said second portion together extend across the major part of said surface area to be hardened;
B) during at least a second stage of the method:
projecting a laser beam from said first laser source onto said surface area of said first journal, so as to produce an effective laser spot on said surface area, said effective laser spot extending, in said first direction, across the major part of the surface area to be hardened; and
during both of the first and second stages of the method, generating a relative movement between the surface of the crankshaft and the laser source in said circumferential direction, so as to subsequently project the effective laser spots onto different portions of said surface areas in the circumferential direction;

said effective laser spots featuring a two-dimensional energy distribution.

13. The method according to claim 12, wherein the first portion is placed substantially adjacent said second portion, without any substantial overlap between the first portion and the second portion.

14. The method according to claim 12, wherein the first portion and the second portion are substantially overlapping with each other.

15. The method according to claim 11, wherein during at least one stage of the process, two journals having the first width are hardened in one step, and one journal having the second width is hardened in a second step, said steps following one after the other, and without any relative movement between the laser sources and the crankshaft, in the second direction, between said two steps.

16. A method for hardening surface areas of at least two crankshafts, the method including the following steps:
  providing a first laser source and a second laser source,
  during at least one stage of the method, simultaneously projecting a laser beam from the first laser source and a laser beam from the second laser source onto a first one of said crankshafts whereby a first one of said crankshafts is hardened during at least one stage of the method,
  projecting a laser beam from the first laser source onto said first one of said crankshafts during at least another stage of the method, whereby said first one of said crankshafts is hardened and
  projecting a laser beam from the second laser source onto a second one of said crankshafts to simultaneously harden the second one of said crankshafts.

17. The method according to claim 16, further including the step of simultaneously projecting a laser beam from the first laser source and a laser beam from the second laser source onto the first one of said crankshafts during at least one stage of the method to harden the first one of said crankshafts, while projecting a laser beam from a third laser source onto the second one of said crankshafts, for hardening the second one of said crankshafts.

* * * * *